United States Patent
Akao

[11] Patent Number: 5,906,813
[45] Date of Patent: *May 25, 1999

[54] INJECTION MOLDED ARTICLE USED WITH PHOTOSENSITIVE MATERIAL

[75] Inventor: Mutsuo Akao, Kanagawa, Japan

[73] Assignee: Fuji Photo Film Co., Ltd., Kanagawa, Japan

[*] Notice: This patent is subject to a terminal disclaimer.

[21] Appl. No.: 08/880,504

[22] Filed: Jun. 23, 1997

[30] Foreign Application Priority Data

Jun. 21, 1996 [JP] Japan .................................. 8-162043
Jul. 8, 1996 [JP] Japan .................................. 8-177642

[51] Int. Cl.$^6$ .............................. A61L 9/01; G03B 23/02
[52] U.S. Cl. ....................... 424/76.1; 242/348; 242/348.4
[58] Field of Search ........................ 424/76.1; 430/347, 430/496, 501; 242/348, 348.4

[56] References Cited

U.S. PATENT DOCUMENTS 5,543,270 8/1996 Akao et al. .............................. 430/347

*Primary Examiner*—Thurman K. Page
*Assistant Examiner*—Kathryne E. Shelborne
*Attorney, Agent, or Firm*—Sughrue, Mion, Zinn, Macpeak & Seas, PLLC

[57] ABSTRACT

Injection molding is carried out by using styrene-based resin composition. As to the styrene-based resin composition, styrene-based resin, in which melt flow index is 3.0–40.0 g/10 minutes, a Rockwell hardness is M38 or more, an Izod impact strength is 2.0 Kg·cm/cm or more, a bending elastic modulus is 20,000 Kg/cm$^2$ or more, and a Vicat softening point is 78° C. or more, is 50 wt. % or more, total of at least two kinds selected from lubricant or surfactant is 0.01–20 wt. %, a thermoplastic resin having experienced twice or more heat histories at 150° C. or more is 3 wt. % or more, and total of at least one of antioxidant, deodorant and an agent imparting fragrance is 0.01–20 wt. %. Styrene-based resin composition having melt flow index of 1–50 g/10 minutes, and including ethylbenzene of 0.001–1 wt. %, rubber-like material of 0.1–15 wt. %, and light shielding material of 0.1–10 wt. %, may be used.

13 Claims, 8 Drawing Sheets

INJECTION MOLDED ARTICLE USED WITH PHOTOSENSITIVE MATERIAL

BACKGROUND OF THE INVENTION

1. Field of the Invention

The present invention relates to a injection molded article used with photosensitive material, for example, a photo film cartridge, a photo sheet film case, a lens-fitted film unit, a container for photo film cassette, a photo film spool, a photo film cassette made of resin (a cassette for so-called advanced photo system and so on), an instant film unit, an instant film pack, a cartridge for photo disc film, a winding spool, a cassette shell, a core for film-like photosensitive material, a sheet film pack and a sheet film unit.

2. Description of the Related Art

Conventionally, injection molded articles used with photosensitive material, for example, 135-type photo film spool, a core for film-like photosensitive material, a lens-fitted film unit in which a photo film is built beforehand, and a photo film cassette made of resin (for Advanced Photo System, hereinafter, APS), are molded by injection with various resin compositions in order to improve light shielding property, impact resistance, abrasion resistance and so forth.

Japanese Utility Model Publication No. 61-36995 discloses that a photo film spool is made of polystyrene resin or impact resistance polystyrene resin. In this case, when a film end engages with a claw provided on the photo film spool, excellent engaging force of 11.3 Kg is obtained.

Japanese Utility Model Publication No. 2-37799 discloses that a core for film-like photosensitive material is molded by using impact resistance polystyrene resin including rubber-like material, and a gate position of which is restricted. In this case, generation of weld line is reduced and compression strength is improved. Further, injection molding property is improved because gate processing is not required.

Japanese Patent Laid-open publication No. 63-226643 discloses that a lens-fitted film unit is molded by using resin composition in which carbon black is added in impact resistance polystyrene resin of low melt flow index. In this case, necessary light shielding property is obtained.

Japanese Patent laid-open Publication No. 1-312538 discloses that an outer case of a photo film cassette (APS) is molded by resin composition in which carbon black is added to impact resistance polystyrene resin of low melt flow index. In this case, necessary light shielding property is obtained.

Resin composition having light shielding property for a lens-fitted film unit, a photo film cassette made of resin and so forth are disclosed in Japanese Patent Laid-open Publication No. 7-295150. In the resin composition, at least one kind of organic compound having number average molecular weight of less than 10,000 is 0.001–45 wt. %, at least two kinds of antioxidant are 0.002–1 wt. %, and at least one kind of thermoplastic having number average molecular weight of 10,000 or more is 50 wt. % or more.

However, when the photo film spool is molded with above-described resin composition, scatter due to molding tends to be generated and engaging force and physical strength are sometimes greatly different. Further, injection molding property, heat resistance, dimensional accuracy, slip property, antistatic and abrasion resistance are not sufficient and there arises a problem with respect to photographic property.

When a core for film-like photosensitive material is molded by injection with resin composition including rubber-like material or the like, a wound photosensitive material roll is hard to slip due to property of the rubber-like material so that good winding is obtained. However, friction force of the core surface becomes large so that injection molding property and abrasion resistance are not sufficient. Further, when the core surface becomes slippy due to lubricant, surfactant and so forth added thereto, winding property of the roll film becomes bad. It is hard to obtain good winding, injection molding property and abrasion resistance at the same time.

As to the above-described lens-fitted film unit, carbon black is added in conventional impact resistance polystyrene resin of low melt flow index so that it is necessary to increase the resin temperature because flowability of the resin decreases. Therefore, pyrolysis of the resin and the additive tends to be generated so that it is hard to obtain a good photographic property. Further, molding cycle is long and appearance is not good because many weld lines are generated. Moreover, physical strength is low. This is caused due to lack of consideration about the resin composition. Accordingly, further improvement of the resin is desired.

Due to the resin composition used for the photo film cassette, sufficient light shielding property is obtained. However, molding cycle is long and it is expensive. The improvement of slipping property, antistatic, photographic property, heat resistance, appearance and physical strength are desired to be improved. Moreover, many weld lines are generated.

On the other hand, due to the above-described conventional injection molding material, it is possible to reduce generation of micro grid and deterioration of photographic property. Further, generation of trouble due to burned resin is a little so that it is possible to perform successive molding. However, in order to obtain perfect light shielding by adding light shielding material of 2 wt. % or less, further improvement is desired. The light shielding material is fine particle and tends to cohere such as carbon black having a mean particle size of 100 m$\mu$ or less and oil absorption of 50 ml/100 g or more. Moreover, in order to improve the physical strength of injection molded article and to reduce the generation of weld lines, further improvement is desired.

SUMMARY OF THE INVENTION

In view of the foregoing, it is a primary object of the present invention to provide an injection molded article used with photosensitive material in which bad influence is not applied to photographic property, injection molding property is excellent, dispersibility and flowability of light shielding material are improved, appearance, physical strength and dimensional accuracy are excellent, and perfect light shielding, slipping property, antistatic and heat resistance are given.

It is a second object of the present invention to provide an injection molded article used with photosensitive material in which bad influence is not applied to photographic property of the photosensitive material, injection molding property and dispersibility of carbon black is excellent, perfect light shielding is obtained, static mark is not generated on the photosensitive material, physical strength is improved, and abrasion resistance and dimensional accuracy are excellent.

In order to active the above and other objects, the injection molded article used with photosensitive material is molded by using styrene-based resin composition.

In a preferred embodiment, the styrene-based resin composition has melt flow index of 1–50 g/10 minutes, and includes ethylbenzene of 0.001–1 wt. %, rubber-like material of 0.1–15 wt. %, and light shielding material of 0.1–10 wt. %.

In an another embodiment, as to the styrene-based resin composition, styrene-based resin, in which melt flow index is 3.0–40.0 g/10 minutes, a Rockwell hardness is M38 or more, an Izod impact strength is 2.0 Kg·cm/cm or more, a bending elastic modulus is 20,000 Kg/cm² or more, and a Vicat softening point is 78° C. or more, is 50 wt. % or more, total content of at least two kinds selected from lubricant or surfactant is 0.01–20 wt. %, thermoplastic resin having experienced twice or more heat histories at 150° C. or more is 3 wt. % or more, and total content of at least one of antioxidant, deodorant and agent imparting fragrance is 0.01–20 wt. %.

According to the present invention, the styrene-based resin secures physical strength and flexural strength. The lubricant or the surfactant improve lubricity so as not to generate static mark on the photosensitive material. The thermoplastic resin reduces the occurrence of weld line and improves compression strength. The antioxidant, the deodorant and/or the agent imparting fragrance improve photographic property of the photosensitive material and utility for user (elimination of smell and so on).

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
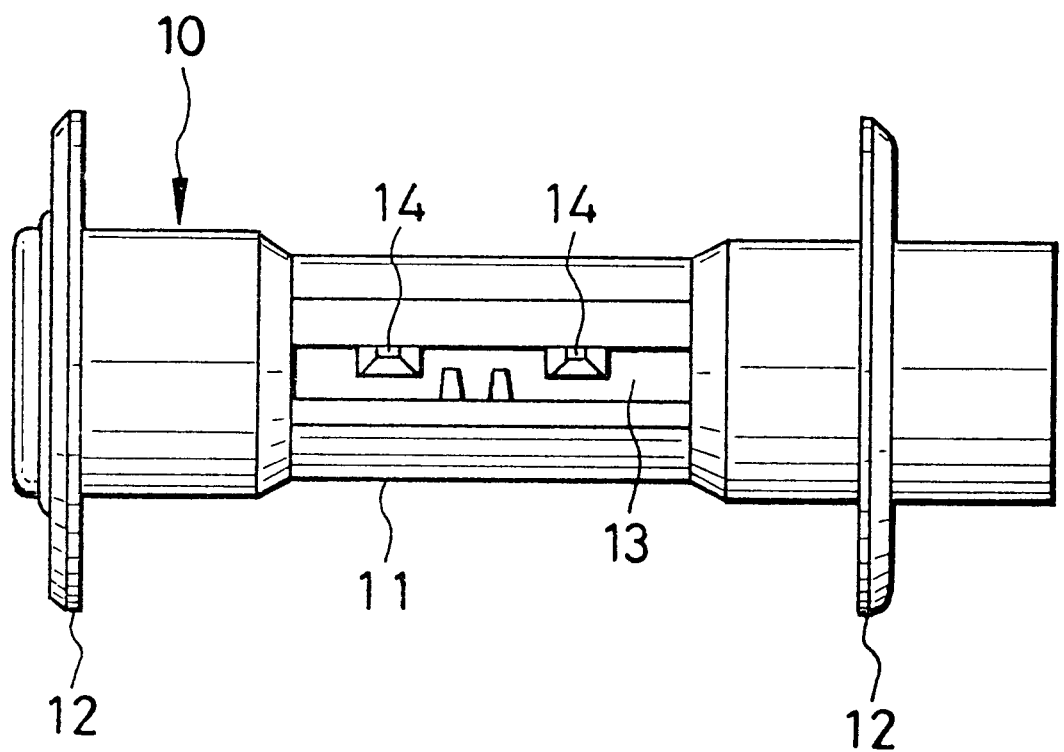
FIG. 1 is a front view of a photo film spool as an injection molded article used with photosensitive material according to the present invention.

As typical styrene-based resins, there are styrene resin, ABS resin and so forth. As the styrene resin, there are transparent GP polystyrene (GPPS)resin and high impact polystyrene (HIPS) resin. The DPPS resin is homopolystyrene resin in which only styrene monomer is polymerized. The HIPS resin is rubber including polystyrene resin reinforced by rubber-like material. Polystyrene portion of these is normal chain and amorphous. By using Natta catalyser, isotactic polystyrene is obtained. This is not transparent and deflection temperature of which is about 200° C. so that it is suitable for colored injection molded article used under sunbeam, for example, a photo film cassette (APS) and a lens-fitted film unit.

Characteristics of the styrene resin are enumerated as follows.

(1) Specific gravity is small.

(2) The resin does not have any taste, any odor and any toxicity.

(3) Moisture absorption is small.

(4) Electrical insulation and high frequency insulation are excellent.

(5) Coloring property and coating property are good.

(6) Mold processing is excellent.

(7) Dimensional stability of molds is good.

(8) The resin is comparatively low in price.

However, the resin has shortcomings enumerated below in accordance with use.

(1) Impact resistance is not sufficient.

(2) The resin is eroded by some of oil and organic solvent.

(3) Heat resistance is not sufficient.

(4) The resin tends to burn.

(5) Weatherability is not sufficient.

(6) The resin tend to be charged with electricity.

Almost all styrene resins are produced by continuous bulk polymerization method in which polymerization process, deaeration and monomer collection process, and granulation process are continuously combined. Some of the styrene resin are produced by suspension batch polymerization method. In view of photographic property, quality, cost and so forth, impact resistance polystyrene resin produced by the continuous bulk polymerization method and including synthetic rubber of 0.5–15 wt. % is preferable. Either methods are typical radical polymerization method.

As makers of the styrene resin in Japan, there are, for example, Asahikasei industry, Idemitsu oil chemical, Shin-nippon Seitetu Co., Ltd, Dainippon Ink chemical industry, Denki Kagaku industry, Nippon polystyrene, Mitsui Toatsu and Mitsubishi Monsanto.

As to the rubber including polystyrene resin (rubber including aromatic mono vinyl resin), there are three aggregate states. First of them is polymer of rubber-like material and aromatic mono vinyl. Second of them is mixture of rubber-like material and aromatic mono vinyl kneaded each other. Third of them is mixture of aromatic mono vinyl resin and polymer of rubber-like material and aromatic mono vinyl resin. By including the rubber-like material, impact resistance is improved.

As to the rubber-like material, there are, for example, ethylene propylene copolymer, ethylene propylene non-conjugated diene copolymer, isoprene copolymer, polyisoprene, styrene-isoprene copolymer, polybutadiene, styrene butadiene copolymer. As the polybutadiene, high-cis polybutadiene (preferably, cis 1,4 bond is 70 mol % or more, more preferably, 90 mol % or more) and low-cis polybutadiene are either used. With respect to a mean particle size of the rubber-like material, 0.1–10 μm is suitable and 0.2–7 μm is preferable, and 0.5–5 μm is more preferable. when the mean particle size is less than 0.1 μm, impact strength is reduced and cost is increased. When the mean particle size is more than 10 μm, appearance becomes bad so that worth of goods decreases. In order to increase the worth of the injection molded article, it is preferable to use the rubber-like material in which the mean particle size is 0.1–1.5 μm, because light reflection proof is improved and photographic fog is prevented. In case of using for a photo film spool and the like, it is preferable to use the rubber-like material in which the mean particle size is 1.5–10 μm. In this case, 1.7–8 μm is preferable and 2–6 μm is more preferable.

As the aromatic mono vinyl, for example, styrene, nucleus alkyl-substituted styrene, nucleus styrene halide and α-alkyl-substituted styrene are used. The nucleus alkyl-substituted styrene is, for example, o-methyl styrene, p-methyl styrene, m-methyl styrene, 2,4-dimethyl styrene, ethyl styrene and p-tert-butyl styrene. The nucleus styrene halide is, for example, 2,4,6-triplomostylene and 2,4,6-trichlorostylene. The α-alkyl-substituted styrene is, for example, α-methyl styrene and α-methyl-p-methyl styrene. Besides that, there are styrene-based monomer, methacrylate, acrylate, acrylonitrile and maleic anhydride.

When the rubber including aromatic mono vinyl resin is polymer of rubber-like material and aromatic mono vinyl, polymerization is performed by radical polymerization method (batch bulk polymerization method, continuous bulk polymerization method, continuous solution polymerization method, suspension polymerization method, emulsion polymerization method and so on) or ion polymerization method. Economically, bulk-suspension polymerization method and bulk polymerization method in which styrene monomer is reacted at radical due to rubber-like polymer are preferable, and in particular, continuous bulk polymerization method is preferable. On the other hand, in view of heat resistance, suspension polymerization (batch style) is preferable.

ABS resin is thermoplastic resin mainly including acrylonitrile (A), butadiene (B) and styrene (S). The ABS resin further includes polybutadiene as the rubber-like material. AS copolymer is grafted on a particle of dispersion polybutadiene so that compatibility of polybutadiene particle and AS continuous phase is excellent and agglutination of polybutadiene is not generated. ABS resin is graft rubber particle dispersion system similar to high impact polystyrene (impact resistance polystyrene, HIPS) resin so that viscoelasticity temperature property is separated into dispersion absorbing of about −80° C. due to polybutadiene rubber and dispersion absorbing of about +120° C. due to AS copolymer.

The greatest feature of ABS resin is that impact strength is excellent. As the ground of this, there is supported Craze theory based on absorption of impact energy due to deformation of polybutadiene particle and absorption of impact energy due to formation of craze generated from polybutadiene particle interface. In order to increase the impact strength, there is report that mechanism for restraining propagation and break of craze is important besides generation of craze.

As the other features, injection molding processability is good and rigidity and chemical resistance are excellent. Further, it is free to be colored due to light shielding material. It is suitable for conversion of coating, printing, hot stamp, vacuum deposition, plating and so on. Blend system with other resin, for example, polycarbonate resin, and polyvinyl chloride forms molding group having features as ABS alloy. A shortcoming is that photographic property is bad and weatherability is inferior. However, it is possible to put it to practical use by adding specific kinds of additive, for example, carbon black and antioxidant and by considering the resin composition.

Recently, as producing method, grand blend method is widely used. In the method, ABS resin having high content of rubber is produced by reacting AN/ST (styrene) monomer for polybutadiene latex and the ABS resin is blended to AS resin copolymer resin produced separately.

Further, there is bulk-suspension method in which non-crosslinking rubber is melted for styrene monomer to perform pre-bulk polymerization of rubber matrix state and the ABS resin is obtained by performing graft reaction of suspension system when phase transition to rubber dispersion state occurs. As the other method, there is emulsion-bulk polymerization method in which AN/ST monomer and electrolyte are added to ABS latex produced by emulsion polymerization method and the ABS resin is obtained by performing continuous bulk polymerization as ABS dope adding AN/ST monomer to ABS clam which is produced by eliminating moisture. Upon using this method, photographic property does not become worse and it is possible to decrease the cost because processes of coagulation, washing by water and drying, are not required for ABS powder. Accordingly, this method is especially preferable for the present invention.

Japanese makers producing the ABS resin by using one of above-described methods are, for example, Asahi Kasei, Ube Saycom, Toray, Mitsubishi Rayon, Nippon Gosei Rubber, Kyodo polymer, Mitsubishi Monsanto, Sumitomo norgatack, Denki Kagaku.

In a preferred embodiment, content of the rubber-like material with respect to such a styrene-based resin is 0.5–15 wt. %. As to the content, 1–12 wt. % is preferable, 5–10 wt. % is more preferable, and 2–3 wt. % is most preferable. When the content is less than 0.5 wt. %, physical strength is small so that it is impossible to put the injection molded article to practical use in view of lack of strength and abrasion resistance for the injection molded article used under the condition that temperature is less than 0° C. When the content is more than 15 wt. %, photographic fog of the photosensitive material increases. Accordingly, unevenness of print density occurs so that it is also impossible to put it to practical use. Further, the cost is increased and bending elastic modulus becomes small.

In an another embodiment, content of the rubber-like material with respect to such a styrene-based resin is 0.1–15 wt. %. As to the content, 0.5–12 wt. % is preferable, 1.0–10 wt. % is more preferable and 1.5–8 wt. % is most preferable.

In a preferred embodiment, melt flow index (hereinafter, MFI. ASTM D-1238-88G, temperature is 200° C., piston load is 5 Kg, or JIS K-6870) of the styrene-based resin is 3.0–40.0 grams per 10 minutes. As to the MFI, 5.0–35.0 grams per 10 minutes is preferable, 7.0–30.0 grams per 10 minutes is more preferable, and 10.0–25.0 grams per 10 minutes is most preferable. When the MFI is less than 3.0 grams per 10 minutes, flowability of resin is bad, many molding troubles, for example, short shot and weld line, occur and molding cycle becomes long so that it is impossible to put the injection molded article to practical use. When MFI is more than 40 grams per 10 minutes, physical strength becomes small, many burrs are generated and heat degradation tend to occur so that it is also impossible to put it to practical use.

In an another embodiment, the MFI of the styrene-based resin is 1.0–50 grams per 10 minutes. As to the MFI, 2.0–40 grams per 10 minutes is preferable, 3.0–30 grams per 10 minutes is more preferable, and 4.0–25 grams per 10 minutes is most preferable.

In a preferred embodiment, bending elastic modulus (JIS K-7203) of the styrene-based resin is equal to or more than 20,000 Kg/cm$^2$. As to the bending elastic modulus, 22,000 Kg/cm$^2$ or more is preferable, 23,000 Kg/cm$^2$ or more is more preferable, and 25,000 Kg/cm$^2$ or more is most preferable. When the bending elastic modulus is less than 20,000 Kg/cm$^2$, deformation tend to occur by applying external force and it is impossible to maintain dimensional accuracy and perfect light shielding. In particular, if a photo film spool, an outer surface of a photo film cassette (APS system), a photo film cartridge (K16 film, K35 film) and a sheet film pack are deformed, it becomes hard to load them in a camera.

In an another embodiment, bending elastic modulus (JIS K-7203) of the styrene-based resin is equal to or more than 18,000 Kg/cm$^2$. 20,000 Kg/cm$^2$ or more is preferable, 22,000 Kg/cm$^2$ or more is more preferable, and 23,000 Kg/cm$^2$ or more is most preferable.

Vicat softening point (JIS K-6870) of the styrene-based resin is equal to or more than 78° C. As to the Vicat softening point, 82° C. or more is preferable, 85° C. or more is more preferable and 87° C. or more is most preferable. When the Vicat softening point is less than 78° C., as the injection molded article is colored in black, softening deformation occurs by leaving it under sunbeam over one hour. At this time, it becomes impossible to use it. Further, perfect light shielding property is reduced. In the case of a photo film spool, a photo film cassette (APS system), a lens-fitted film unit and so on, advancement of a photo film is not performed smoothly by deformation thereof.

Rockwell hardness (ASTM D-785) of the styrene-based resin is equal to or more than M38. As to the Rockwell hardness, M40 or more is preferable, M45 or more is more preferable, M50 or more is further preferable, and M55 or more is most preferable. When the Rockwell hardness is less than M38, there occur flaws by friction with a metal, a photo film and so on. Further, dimensional accuracy is not maintained. With respect to a photo film cassette or the like, there is a probability that spot troubles occur due to abrasion trash stuck on a photosensitive material.

Izod impact strength (JIS K-6871) of the styrene-based resin is equal to or more than 2.0 kg·cm/cm. As to the Izod impact strength, 2.5 kg·cm/cm or more is preferable, 3.0 kg·cm/cm or more is more preferable, and 3.5 kg·cm/cm or more is most preferable. When the izod impact strength is less than 2.0 kg·cm/cm, physical strength is small. Especially, for a photo film spool, a photo film cassette (APS system), a camera body, a lens-fitted film unit, a photo film cartridge and so forth which are used under the condition of 0° C. or less, it is hard to put them to practical use due to lack of strength in case of falling down.

In the injection molded article used with photosensitive material according to the present invention, the styrene-based resin having above-described properties is included by 50 wt. % or more. As to the content, 60 wt. % or more is preferable, 65 wt. % or more is more preferable, 70 wt. % or more is further preferable, and 80 wt. % or more is most preferable. When the content is less than 50 wt. %, dimensional accuracy is not maintained and physical strength becomes small. Accordingly, crack and the like occur due to lack of strength in case of falling dawn. In this case, perfect light shielding property is not maintained. Especially, when the temperature is equal to or less than 0° C., physical strength is further decreased. Moreover, abrasion resistance runs short. Therefore, it is difficult to put the injection molded article to practical use.

In the injection molded article used with photosensitive material according to another embodiment, ethylbenzene of 0.001–1 wt. % is contained within the styrene-based resin having above-described properties. The ethylbenzene acts as supplementary monomer of rubber-like material and is obtained by performing alkyl reaction of ethylene and benzene, utilizing catalyser of chlorinated aluminum, phosphoric acid, molecular sieve and so on. Besides that, the ethylbenzene is obtained by branching from C8 aromatic mixture. As to content of the ethylbenzene, 0.002–0.5 wt. % is preferable, 0.003–0.3 wt. % is more preferable, and 0.005–0.1 wt. % is most preferable. When the ethylbenzene is less than 0.001 wt. %, it does not function as the supplementary monomer of rubber-like material. Further, dispersibility of the rubber-like material and flowability of the resin deteriorate. When the content is more than 1 wt. %, material cost is increased without extending effect. Further, dispersibility of the light shielding material get worse, blowing of the resin occurs, and flowability of the resin decreases. Accordingly, it is difficult to perform injection molding. Moreover, troubles of silver streak and short shot occur so that it is difficult to put the injection molded article to practical use. By containing inhibitor, for example hydroquinone, of 0.1 wt. % or less, change of physical property may be prevented.

In order to prevent luster, fog of photographic material and so forth, light shielding material described below is added to the styrene-based resin. Content of the light shielding material is 0.1–20 wt. %. As to the content, 0.15–15 wt. % is preferable, 0.2–10 wt. % is more preferable, and 0.25–5 wt. % is most preferable. When the content is less than 0.1 wt. %, light shielding property runs short and photographic fog occur. When the content is more than 20 wight percent, dispersibility of the light shielding material get worse and flowability of the resin decreases. Accordingly, it is difficult to perform injection molding. Further, physical strength and abrasion resistance are decreased so that it is difficult to put the injection molded article to practical use. It is indispensable to add the light shielding material by necessary amount.

In an another embodiment, content of the light shielding material is 0.1–10 wt. %. As to the content, 0.2–8 wt. % is preferable, 0.3–6 wt. % is more preferable, and 0.4–4 wt. % is most preferable.

Typical light shielding materials are described below.

1. Inorganic compounds:

(1) Oxide; silica, diatomaceous earth, alumina, titanium oxide, iron oxide, zinc oxide, magnesium oxide, antimony oxide, barium ferrite, strontium ferrite, beryllium oxide, pumice stone, pumice stone balloon, and alumina fiber.

(2) Hydroxide; aluminum hydroxide, magnesium hydroxide, and basic magnesium carbonate.

(3) Carbonate; calcium carbonate, magnesium carbonate, dolomite, and danalite.

(4) Sulfate and sulfite: calcium sulfate, barium sulfate, ammonium sulfate, and calcium sulfate.

(5) Silicate; talc, clay, mica, asbestos, glass fiber, glass balloon, glass bead, calcium silicate, montmorillonite, and bentonite.

(6) Carbon; carbon black, graphite, carbon fiber, and carbon hollow sphere.

(7) Other compounds; iron powder, copper powder, lead powder, tin powder, stainless steel powder, pearlescent pigment, aluminum powder, molybdenum sulfide, boron fiber, silicon carbide fiber, aluminum fiber, stainless fiber, nickel fiber, brass fiber, potassium titanate, lead titanate zirconate, zinc borate, barium metaborate, calcium borate, sodium borate, and aluminum paste.

2. Organic compounds:

Wood meal (pine, oak, sawdust), husk fiber (almond, peanut, rice hull), and various colored fibers, such as cotton, jute, paper strip, cellophane piece, nylon fiber, polypropylene fiber, starch, and aromatic polyamide fiber.

Among the light shielding materials, the carbon black is preferable because bleed out of lubricant and surfactant is reduced. Among classifications based on the raw material of carbon black, furnace carbon black is particularly preferable. As to the furnace carbon black, in view of low cost, photographic fog, photosensitive, light shielding ability, and pin hole of injection molded article, range of pH (JIS K-6221) is 4.0–9.0, and pH of 5.5–8.0 is preferable. Volatile content (JIS K-6221) is equal to or less than 3.0% and 2.0% or less is preferable. Mean particle size (measured by electron microscope) is 10–120 m$\mu$ and 15–80 m$\mu$ is preferable. All sulfur (ASTM D-1619) is equal to or less than 1.0% and 0.5% or less is preferable. Free sulfur content (JIS K-6350) is equal to or less than 0.1% and 0.05% or less is preferable. Cyanide content (4-pyridine carboxylic acid-pyrazolone method) is equal to or less than 0.3% and 0.1% or less is preferable. DBP oil absorption (ASTM D-2414) is equal to or more than 50 ml/100 g and 60 ml/100 g is preferable. In the furnace carbon black, oil furnace carbon black is particularly preferable because it does not damage photographic property of the photosensitive material and has excellent light shielding ability. Further, the oil furnace carbon black has good dispersibility and is low in price. Acetylene carbon black in which all sulfur is equal to or less than 0.05% and 1/10 of the furnace carbon black is also preferable.

It is also preferable to mix acetylene carbon black, ketchen carbon black and/or electroconductive carbon black with the furnace carbon black. The acetylene carbon black is light shielding material having antistatic effect and the ketchen carbon black is modification accessory carbon black.

In order to improve uniform dispersibility of the light shielding material, it is preferable to add plasticizer. Typical plasticizers are described below.

(1) Phthalate plasticizer: diheptyl phthalate, dioctyl phthalate, diisodecyl phthalate, butyl lauryl phthalate, ditridecyl phthalate, butyl benzyl phthalate, butyl phthalyl butyl glycolate.

(2) Phosphoric plasticizer: tricresyl phosphate, trioctyl phosphate.

(3) Fatty plasticizer: tri-n-butyl citrate, dioctyl adipate, dioctyl azelate, dioctyl sebacate, methyl acetylricinoleate.

(4) Epoxy plasticizer: alkyl epoxy stearate, di-isodecyl 4,5-epoxy-tetrahydrophthalate, (5) Other plasticizer: chlorinated paraffin, polyester, sucrose octacetate.

As to content of the plasticizer, 0.01–10.0 wt. % is preferable, 0.05–7.0 wt. % is more preferable, and 0.1–5.0 wt. % is most preferable. When the content is less than 0.01 wt. %, cost of kneading is increased without improving uniform dispersibility of the light shielding material. When the content is more than 10.0 wt. %, slip occurs between a screw of extruder and resin composition so that it is impossible to extrude the resin by stable amount.

In an another embodiment according to the present invention, an injection molded article is molded by adding higher fatty acid or higher fatty acid metallic salt of 0.001–10 wt. % to styrene-based resin composition.

By adding higher fatty acid and/or higher fatty acid metallic salt, bleed out is reduced and dispersibility of organic nucleus-making agent is improved. Further, the higher fatty acid metallic salt improves dispersibility of the light shielding material, flowability of the resin, injection molding property and lubricity of injection molded article. Moreover, photographic property is improved because halide is neutralized. The halide gives bad influence for the photographic property of the photosensitive material included in the resin.

Content of the higher fatty acid and/or higher fatty acid metallic salt is 0.001–10 wt. %. As to the content, 0.005–8 wt. % is preferable, 0.01–6 wt. % is more preferable, and 0.02–4 wt. % is most preferable. When the content is less than 0.001 wt. %, cost of kneading is increased without effect due to adding it. When the content is more than 10 wt. %, bleed out occurs. Further, slip occurs between a screw of extruder and resin so that extruding amount becomes unstable and many molding trouble occur. Moreover, it is hard to knead in uniform state.

As the higher fatty acid, there are, for example, oxyfatty acid, caproic acid, lauric acid, stearic acid, oleic acid, erucic acid, lactic acid, succinic acid, phthalic acid, benzoic acid, palmitic acid, stearyl lactic acid, hydroxystearic acid, ricinolic acid, naphthenic acid. The higher fatty acid metallic salt is compound of above-described higher fatty acid and metal, for example, Li, Na, Mg, Ca, Sr, Ba, Zn, Cd, Al, Sn and Pb.

In other embodiment according to the present invention, an injection molded article is constituted of styrene-based resin composition having melt flow index of 1–50 grams per 10 minutes and including ethylbenzene of 0.001–5 wt. %, impact resistance polystyrene resin of 30–90 wt. %, carbon black of 0.01–5 wt. %, and lubricant of 0.01–10 wt. %. In the impact resistance polystyrene resin, styrene is copolymerized with synthetic rubber of 0.1–15 wt. %.

These polystyrene resin, ethylbenzene, impact resistance polystyrene resin (aromatic mono vinyl resin including rubber), and carbon black may be similar to described one in the foregoing.

Content of the carbon black is 0.01–5 wt. % in view of price, physical strength, light shielding, injection molding property, and appearance. As to the content, 0.02–4 wt. % is preferable, 0.03–3 wt. % is more preferable, and 0.05–2 wt. % is most preferable. When the content is less than 0.01 wt. %, it is hard to maintain light shielding property. At this time, if thickness is increased in order to maintain the light shielding property, molding cycle becomes long and amount of used resin increases so that cost is increased. When the content of carbon black is more than 5 wt. %, physical strength of the photo film spool is reduced. Further, weld line and fog occur and bad influence are given for the photographic property of the photosensitive material because of water absorption. Moreover, defective appearance (silver streak, unevenness of luster, and reduction of luster) and scrape occur. Flowability of the resin is reduced so that injection molding property is reduced.

Content of the lubricant is 0.01–10 wt. %. As to the content, 0.02–8 wt. % is preferable, 0.03–6 wt. % is more preferable, and 0.05 –4 wt. % is most preferable. By adding the lubricant of suitable amount, friction of movable parts is reduced. With respect to the photo film cassette and the photo film spool, film winding torque is reduced. It is effective for reduction of friction, friction waste and noise. Further, it is effective for improvement of durability and moldability. When the content is less than 0.01 wt. %, there is no effect due to adding it and cost of kneading increases. Moreover, moldability becomes bad so that it is hard to mold and many troubles occur in the producing process. When the content of the lubricant is more than 10 wt. %, material cost increases without effect due to adding it. Further, dust tend to stick because it becomes sticky. Moreover, bleed out occurs and slip occurs between a screw of extruder and resin. Accordingly, extruding amount becomes unstable so that many molding trouble occur and it is hard to knead in uniform state.

In the styrene-based resin composition, at least two kinds of lubricant and/or surfactant selected from the following are added. These lubricant and/or surfactant reduce friction of movable members. These are effective for reduction of friction, friction waste and noise. Further, these are effective for improvement of durability and moldability. Typical lubricants on market and manufacturer thereof are described below.

1. Fatty acid amide lubricants:

[Saturated fatty acid amide lubricants]

(1) Behenic amide lubricant; DIAMID KN (trade name, manufactured by Nippon Kasei).

(2) Stearic acid amide lubricant; AMIDE HT (Lion Fat & Oil), ALFLOW S-10 (trade name, manufactured by Nippon Oils & Fats), FATTY AMIDE S (trade name, manufactured by Kao), DIAMID 200 (trade name, manufactured by Nippon Kasei), DIAMID AP-1 (trade name, manufactured by Nippon Kasei), AMIDE S and AMIDE T (trade name, manufactured by Nitto Chemical), NEWTRON-2 (trade name, manufactured by Nippon Fine Chemical).

[Unsaturated fatty acid amide lubricants]

(1) Erucic acid amide lubricants; ALFLOW P-10 (trade name, manufactured by Nippon Oils & Fats), NEWTRON-S (trade name, manufactured by Nippon Fine Chemical), LUBROL (trade name, manufactured by I·C·I), DIAMID L-200 (trade name, manufactured by Nippon Kasei).

(2) Oleic acid amide lubricants; ARMO SLIP-CP (trade name, manufactured by Lion Akzo), NEWTRON (trade name, manufactured by Nippon Fine Chemical), NEWTRON E-18 (trade name, manufactured by Nippon Fine Chemical), AMIDE O (trade name, manufactured by Nitto Chemical), DIAMID O-200 and DIAMID G-200 (trade name, manufactured by Nippon Kasei), ALFLOW E-10 (trade name, manufactured by Nippon Oils & Fats), FATTY AMIDE O (trade name, manufactured by Kao).

[Bis fatty acid amide lubricants]

(1) Methylene bis behenic acid amide lubricants; DIAMID NK BIS (trade name, manufactured by Nippon Kasei).

(2) Methylene bis stearic acid amide lubricants; DIAMID 200 BIS (trade name, manufactured by Nippon Kasei), ARMO WAX (trade name, manufactured by Lion Akzo), BIS AMIDE (trade name, manufactured by Nitto Chemical).

(3) Methylene bis oleic acid amide lubricants; LUBRON O (trade name, manufactured by Nippon Kasei).

(4) Ethylene bis stearic acid amide lubricants; ARMO SLIP EBS (trade name, manufactured by Lion Akzo)

(5) Hexamethylene bis stearic acid amide lubricants; AMIDE 65 (trade name, manufactured by Kawaken Fine Chemical).

(6) Hexamethylene bis oleic acid amide lubricants; AMIDE 60 (trade name, manufactured by Kawaken Fine Chemical)

2. Nonionic surface active agent lubricants; ELECTROSTRIPPER TS-2, ELECTROSTRIPPER TS-3 (trade name, manufactured by Kao Soap).

3. Hydrocarbon lubricants; liquid paraffin, natural paraffin, micro wax, synthetic paraffin, polyethylene wax, polypropylene wax, chlorinated hydrocarbon, and fluorocarbon. As to paraffin wax, number of carbon atoms is $C_{16}$–$C_{40}$. $C_{20}$–$C_{30}$ is preferable. As to polyethylene wax, polypropylene wax, average molecular weight is 1,000–12,000. 1,500–10,000 is preferable and 2,000–8,000 is more preferable.

4. Fatty acid lubricants; higher fatty acid (whose preferable number of carbon atoms is C12 or more, for example, stearic acid, oleic acid, erucic acid, palmitic acid), and oxy fatty acid.

5. Ester lubricants; fatty acid lower alcohol ester, fatty acid polyvalent alcohol ester, fatty acid polyglycol ester, and fatty acid fatty alcohol ester.

6. Alcohol lubricants; polyvalent alcohol, polyglycol, amino modified silicone, alcohol modified silicone, silicone oil including siloxane linkage.

7. Fatty acid metal salt lubricants (metallic soaps); compounds of fatty acids and metals. The fatty acids are, for example, caproic acid, caprylic acid, myristic acid, lauric acid, stearic acid, succinic acid, behenic acid, linolic acid, stearyl lactic acid, lactic acid, acetic acid, oxalic acid, citric acid, phthalic acid, benzoic acid, hydroxy stearyl acid, montanic acid, ricinoleic acid, naphthenic acid, oleic acid, palmitic acid, and erucic acid. As to these, number of carbons is 6–50. With respect to the number, 10–40 is preferable and 11–35 is more preferable. The metals are, for example, Li, Na, Mg, K, Mn, Ca, Sr, Ba, Co, Ni, Zn, Cd, Al, Sn, Pb, and Cd. stearic acid magnesium, stearic acid zinc, palmitic acid calcium and oleic acid magnesium are preferable.

8. Silicone lubricants; polymethyl phenyl siloxane, olefin modified silicone, amide modified silicone, amino modified silicone, polydimethyl siloxane, diphenyl polysiloxane, carboxyl modified silicone, α-methyl styrene modified silicone, polyether modified silicone, olefin polyether modified silicone, epoxy modified silicone, alcohol modified silicone, and silicone oil including modified siloxane linkage.

Among the lubricants, silicone lubricants are especially preferable in view of physical strength, light shielding property and lubricity. In order to improve lubricity, saturated fatty acid amide lubricants and unsaturated fatty acid amide lubricants are preferable. In the silicone lubricants, olefin modified silicone, polydimethyl siloxane, and amide modified silicone are preferable because bad influence is not given for the photographic property of the photosensitive material.

In order to improve dispersibility and flowability of the light shielding material, ester lubricants, fatty acid metal salt, alcohol lubricants, hydrocarbon lubricants, and fatty acid lubricants are preferable. Especially, fatty acid metal salt is preferable because halide and metallic compound are neutralized. The halide and the metallic compound give the bad influence for the photographic property of the photographic material. In the fatty acid metal salt, stearic acid magnesium and stearic acid zinc are most preferable. When such a fatty acid metal salt is used for the styrene-based resin composition in which content of the styrene resin is 50 wt. % or more, releasability of the injection molded article and rust-proof of a die are improved. Further, the injection molded article may be maintained in good condition and in good quality. The content of the above-described lubricants is 0.001–10 wt. %. As to the content, 0.005–8 wt. % is preferable, 0.01–6 wt. % is more preferable, 0.02–4 wt. % is further preferable, and 0.05–3 wt. % is most preferable.

In an injection molded article according to the present invention, light shielding material, in which Mohs hardness is 2.5 or more and specific gravity is 2.0 or more, is included in the styrene-based resin composition by 0.001–10 wt. %. By including it, light shielding ability becomes large. Upon using it with carbon black and graphite, uniform dispersibility of the light shielding material is improved. Further, light shielding ability is improved more than 20 percent in contrast with singleness use.

With respect to the light shielding material, Mohs hardness is 2.5 or more. As to the Mohs hardness, 3 or more is preferable, 4 or more is more preferable, and 5.5 or more is most preferable. If the Mohs hardness is 2.5 or less, when it is used with carbon black having Mohs hardness of 2.0, light shielding property are not improved. Further, there are problems in that refuse is generated on the wearing portions and strength thereof becomes weak. The specific gravity is 2.0 or more. As to the specific gravity, 2.3 or more is preferable, 2.5 or more is more preferable, and 2.7 or more is most preferable. When the specific gravity is less than 2.0, sufficient shielding of X-ray is not obtained, further, uniform dispersibility and light shielding property are also not obtained. As typical examples in which the Mohs hardness is 2.5 or more and the specific gravity is 2.0 or more, there are calcium carbonate (Mohs hardness is 3–3.5 and specific gravity is 2.8), lithopone (Mohs hardness is 4.5 and specific gravity is 5.6), Chinese white (Mohs hardness is 4.5 and specific gravity is 4.3), titanium oxide (Mohs hardness is 6.0 and specific gravity is 4.0), black iron oxide ($Fe_3O_4$) (Mohs hardness is 6.0 and specific gravity is 4.7). Especially, the titanium oxide and the black iron oxide are preferable. The carbon black has Mohs hardness of 2.0 and specific gravity of 1.8. Accordingly, when the light shielding material having Mohs hardness of 2.5 or more is used with the carbon black, dispersibility of the carbon black is improved, further, light shielding ability is improved more than 20 percent in contrast with singleness use. When the light shielding material having Mohs hardness of 2.5 or more is used, half or less of whole amount of the light shielding material is preferable. Especially, 2–35 wt. % is preferable.

Next, typical surfactants are described below.

[Nonionic]

1. Alkylamine derivatives; T-B103 (trade name, manufactured by Matsumoto Yushi), and T-B104 (trade name, manufactured by Matsumoto Yushi).

Alkylamide types

Tertiary amine (laurylamine); Armostat 400 (trade name, manufactured by Lion Fat & Oil).

N,N-bis (2-hydroxyethylcocoamine); Armostat 410 (trade name, manufactured by Lion Fat & Oil).

Tertiary amine; ANTISTATIC 273C, 273 and 273E (trade name, manufactured by Fine Org. Chem.).

N-hydroxyhexadecyl-di-ethanol-amine; Belg. P. 654,049.

N-hydroxyoctadecyl-di-ethanol-amine; National Dist.

2. Fatty acid amide derivatives; TB-115 (trade name, manufactured by Matsumoto Yushi), Elegan P100 (trade name, manufactured by Nippon Oils & Fats), and Erik SM-2 (trade name, manufactured by Yoshimura Yukagaku).

Hydroxystearic amide.

Oxalic-N,N'-distearylamidebutylester.

Polyoxyethylenealkylamide.

3. Ether types

Polyoxyethylenealkylether $RO(CH_2CH_2O)nH$

Polyoxyethylenealkylphenyl ether;

Special nonionic types: Resistat 104, PE100, 116–118, PE 132 and 139 (trade name, manufactured by Dai-ichi Kogyo Seiyaku), Elegan E115, Chemistat 1005 (trade names, manufactured by Nippon Oils & Fats), Erik BM-1 (trade name, manufactured by Yoshimura Yukagaku), and ELECTROSTRIPPER TS, TS 2, 3, 5, EA, EA2 and 3 (trade name, manufactured by Kao Soap).

4. Polyhydric alcohol ester types

Glycerine fatty acid ester: mono-, di- or triglyceride of stearic acid or hydroxystearic acid, monoglyceride (manufactured by Nippon Shono), TB-123 (trade name, manufactured by Matsumoto Yushi), and Resistat 113 (trade name, manufactured by Dai-ichi Kogyo Seiyaku).

Sorbitan fatty acid ester

Special ester; Erik BS-1 (trade name, manufactured by Yoshimura Yukagaku).

1-Hydroxyethyl-2-dodecylglyoxazoline (manufactured by British Cellophane).

[Anionic]

1. Sulfonic acids; Alkylsulfonate, $RSO_3Na$, Alkylbenzenesulfonate, Alkylsulfate, and $ROSO_3Na$.

2. Phosphoric ester type; Alkyl phosphate.

[Cationic]

1. Amide type cation; Resistat PE300, 401, 402, 406 and 411 (trade name, manufactured by Dai-ichi Kogyo Seiyaku).

2. Quaternary ammonium salts;

Quaternary ammonium chloride,

Quaternary ammonium sulfate,

Quaternary ammonium nitrate,

Catimin CSM-9 (trade name, manufactured by Yoshimura Yukagaku), CATANAC 609 (trade name, manufactured by American Cyanamide), Denon 314C (trade name, manufactured by Marubishi Yuka), Armostat 300 (trade name, manufactured by Lion Fat & Oil), 100V (trade name, manufactured by ARMOR), ELECTROSTRIPPER ES (trade name, manufactured by Kao Soap), and Chemistat 2009A (trade name, manufactured by Nippon Oils & Fats), Stearamido propyl-dimethyl-β-hydroxyethyl ammonium nitrate; CATANAC-SN (trade name, manufactured by American Cyanamide).

[Ampho-ionic]

1. Alkylbetaine type;

2. Imidazoline types; Leostat 53 and 532 (trade name, manufactured by Lion Fat & Oil), AMS 53, 303 and 313 (trade name, manufactured by Lion Fat & Oil);

Alkylimidazoline type.

3. Metal salt types;

AMS 576 (trade name, manufactured by Lion Fat & Oil)

Leostat 826 and 923 (trade name, manufactured by Lion Fat & Oil)

$(RNR'CH_2CH_2CH_2NCH_2COO)_2Mg$ (manufactured by Lion Fat & Oil) wherein $R \geq C$, R'=H or $(CH_2)mCOO-$, $R=C_3-C_6$ hydrocarbon, A=oxygen or an imino group, and M=organic amine or a metal.

4. Alkyl alanine type;

[Others]

Resistat 204 and 205 (trade name, manufactured by Daiichi Kogyo Seiyaku), Elegan 2E and 100E (trade name, manufactured by Nippon Oils & Fats), Chemistat 1002, 1003 and 2010 (trade name, manufactured by Nippon Oils & Fats), Erik 51 (trade name, manufactured by Yoshimura Yukagaku), and ALROMINE RV-100 (trade name, manufactured by Geigy). Further, it is possible to select from various antistatic agents disclosed in "Plastic data handbook" (KK Kogyo Chosakai, issuedon Apr. 5, 1984, pp. 776–778).

Among the above-described surfactant, the nonionic antistatic agent is particularly preferred due to small harmful influence on photographic properties and human body and due to preventing static marks.

The content of at least two kinds of lubricants or surfactants is 0.01–20 wt. %. As to the content, 0.05–15 wt. % is preferable, 0.1–10 wt. % is more preferable, and 0.2–5 wt. % is most preferable. When the content of at least two kinds of the lubricant and/or surfactants is less than 0.01 wt. %, kneading cost increases without effect due to adding it. Further, it is hard to mold because the molding property becomes bad. When the content is more than 20 wt. %, material cost increases without effect due to adding it. Further, dust tend to stick because it becomes sticky. Moreover, bleed out occurs and slip occurs between a screw of extruder and the resin. Accordingly, extruding amount becomes unstable so that many molding trouble occur and it is hard to knead in uniform state.

As the thermoplastic resin, there are styrene resin, ABS resin, copolymer of styrene-based resin and synthetic rubber, copolymer of polyester resin, styrene resin and synthetic rubber. As the thermoplastic resin for which heat history of 150° C. is performed more than two times, styrene butadiene block copolymer resin is preferable. By performing heat history more than two times, flowability of the resin and dispersibility of the light shielding material are improved. Further, materials giving bad influence for the photosensitive material are thermally cracked. Such a thermoplastic resin is included by 3 wt. % or more. When the content is less than 3 wt. %, dispersibility of light shielding material, flowability of the resin, and photographic property are not improved and cost is increased because processes are increased.

By including at least one of antioxidant, deodorant and agent imparting fragrance, smell due to admixture of photosensitive material and pyrogenous residue of the resin may be reduced. Oxidative destruction of the resin and the admixture is prevented by including the antioxidant. Further, physical strength is prevented from reducing, and breakdown product giving bad influence for photographic property is prevented from generating. The breakdown products are, for example, alcohol, aldehyde, ketone and carboxylic acid. By including the deodorant and the agent imparting fragrance, smell generated from the photosensitive material and the thermoplastic resin composition is reduced so that worth of merchandise is raised.

Typical antioxidants used in the present invention are as follows.

(a) Phenol-based antioxidants:

Vitamin E; 6-tert-butyl-3-methylphenyl derivatives; 2,6-di-tert-butyl-p-cresol; 2,2'-methylenebis(4-ethyl-6-tert-butylphenol); 4,4'-butylidenebis(6-tert-butyl-m-cresol); 4,4'-thiobis(6-tert-butyl-m-cresol); 4,4'-dihydroxydiphenylcyclohexane; alkylated bisphenol; styrenated phenol; 2,6-di-tert-butyl-4-methylphenol; n-octadecyl-3-(3',5'-di-tert-butyl-4'-hydroxyphenyl) propionate; 2,2'-methylenebis(4-methyl-6-tert-butylphenol); 4,4'-thiobis(3-methyl-6-tert-butylphenyl); 4,4'-butylidenebis(3-methyl-6-tert-butylphenol); stearyl-β-(3,5-di-tert-butyl-4-hydroxyphenyl)propionate; 1,1,3-tris(2-methyl-4-hydroxy-5-tert-butylphenyl)butane; 1,3,5-trimethyl-2,4,6-tris(3,5-di-tert-butyl-4-hydroxybenzyl)benzene; and tetrakis [methylene-3-(3',5'-di-tert-butyl-4'-hydroxyphenyl) propionate]methane.

(b) Ketone amine condensate-based antioxidants:

6-ethoxy-2,2,4-trimethyl-1,2-dihydroquinoline; polymers of 2,2,4-trimethyl-1,2-dihydroquinoline; and trimethyldihydroquinoline derivatives.

(c) Allylamine-based antioxidants:

Phenyl-α-naphthylamine; N-phenyl-β-naphthylamine; N-phenyl-N'-isopropyl-p-phenylenediamine; N,N'-diphenyl-p-phenylenediamine; N,N'-di-β-naphthyl-p-phenylenediamine; and N-(3'-hydroxybutylidene)-1-naphthylamine.

(d) Imidazole-based antioxidants:

2-mercaptobenzoimidazole; zinc salt of 2-mercaptobenzoi-midazole; and 2-mercaptomethylbenzoimidazole.

(e) Phosphite-based antioxidants:

Alkylated allylphosphite; diphenylisodecylphosphite; sodium tris(nonylphenyl) phosphite; tris(nonylphenyl) phosphite; and triphenyl phosphite.

(f) Thiourea-based antioxidants:

Thiourea derivatives; and 1,3-bis(dimethylaminopropyl)-2-thiourea.

(g) Other antioxidants useful for air oxidation:

Dilauryl thiodipropionate.

Representative examples of commercially available antioxidants and manufactures are described below.

(1) Phenol-based antioxidants:

SUMILIZER BHT (trade name, manufactured by Sumitomo Chemical), IRGANOX 1076 (trade name, manufactured by Ciba Geigy), MARK AO-50 (trade name, manufactured by Adeca Argus), SUMILIZER BP-76 (trade name, manufactured by Sumitomo Chemical), TOMINOX SS (trade name, manufactured by Yoshitomi), IRGANOX 565 (trade name, manufactured by Ciba Geigy), IONOX WSP (trade name, manufactured by ICI), SANTONOX (trade name, manufactured by Monsanto), SUMILIZER WX R (trade name, manufactured by Sumitomo Chemical), ANTAGECRYSTAL (trade name, manufactured by Kawaguchi), IRGANOX 1035 (trade name, manufactured by Ciba Geigy), ANTAGE W-400 (trade name, manufactured by Kawaguchi), NOCLIZER NS-6 (trade name, manufactured by Ohuchi Shinko), IRGANOX 1425 WL (trade name, manufactured by Ciba Geigy), MARK AO-80 (trade name, manufactured by Adeca Argus), SUMILIZER GA-80 (trade name, manufactured by Sumitomo Chemical), TOPANOL CA (trade name, manufactured by ICI), MARK AO-30 (trade name, manufactured by Adeca Argus), MARK AO-20 (trade name, manufactured by Adeca Argus), IRGANOX 3114 (trade name, manufactured by Ciba Geigy), MARK AO-330 (trade name, manufactured by Adeca Argus), IRGANOX 1330 (trade name, manufactured by Ciba Geigy), CYANOX 1790 (trade name, manufactured by ACC), IRGANOX 1010 (trade name, manufactured by Ciba Geigy), MARK AO-60 (trade name, manufactured by Adeca Argus), SUMILIZER BP-101 (trade name, manufactured by Sumitomo Chemical), and TOMINOX TT (trade name, manufactured by Yoshitomi).

(2) Phosphorus-based antioxidants:

IRGAFOS 168 (trade name, manufactured by Ciba Geigy), MARK 2112 (trade name, manufactured by Adeca Argus), WESTON 618 (trade name, manufactured by Vorg-Warner), MARK PEP-8 (trade name, manufactured by Adeca Argus), ULTRANOX 626 (trade name, manufactured by Vorg-Warner), MARK PEP-24G (trade name, manufactured by Adeca Argus), MARK PEP-36 (trade name, manufactured by Adeca Argus), and HCA (trade name, manufactured by Sanko).

(3) Thioether-based antioxidants:

DLTDP "YOSHITOMI" (trade name, manufactured by Yoshitomi), SUMILIZER TPL (trade name, manufactured by Sumitomo Chemical), ANTIOX L (trade name, manufactured by Nippon Oil), DMTD "YOSHITOMI" (trade name, manufactured by Yoshitomi), SUMILIZER TPT (trade name, manufactured by Sumitomo Chemical), ANTIOX M (trade name, manufactured by Nippon Oil), DSTP "YOSHITOMI" (trade name, manufactured by Yoshitomi), SUMILIZER TPS (trade name, manufactured by Sumitomo Chemical), ANTIOX S (trade name, manufactured by Nippon Oil), SEENOX 412S (trade name, manufactured by Sipro), MARK AO-412S (trade name, manufactured by Adeca Argus), SUMILIZER TP-D (trade name, manufactured by Sumitomo Chemical), MARK AO-23 (trade name, manufactured by Adeca Argus), SANDSTAB P-EPQ (trade name, manufactured by Sand), IRGAFOS P-BPQ FF (trade name, manufactured by Ciba Geigy), IRGANOX 1222 (trade name, manufactured by Ciba Geigy), MARK 329K (trade name, manufactured by Adeca Argus), WESTON 399 (trade name, manufactured by Vorg-Warner), MARK 260 (trade name, manufactured by Adeca Argus), and MARK 522 (trade name, manufactured by Adeca Argus).

(4) Metal Deactivator

NAUGARD XL-1 (trade name, manufactured by Uniroyal), MARK CDA-1 (trade name, manufactured by Adeca Argus), MARK CDA-6 (trade name, manufactured by Adeca Argus), IRGANOX MD-1024 (trade name, manufactured by Ciba Geigy), and CUNOX (trade name, manufactured by Mitsui Toatsu).

Preferred antioxidants are the phenol-based ones. Commercially available preferred antioxidants include IRGANOX series products of Ciba Geigy, SUMILIZER BH-76, SUMILIZER WX-R and SUMILIZER BP-101 of Sumitomo Chemical Co., Ltd. Further, it is preferable to use the above-described phenol-based and phosphorus-based antioxidants in combination with carbon black in view of the high effect of antioxidant action. Especially, hindered phenol-based antioxidants are preferable because these have not much unfavorable influence for the photographic property. Typical hindered phenol-based antioxidants on the market are described bellow.

1,3,5-trimethyl-2,4,6-tris(3,5-di-tert-butyl-4-hydroxybenzyl)benzene;

tetrakis[methylene(3,5-di-tert-butyl-4-hydroxyhydrocinnamate)]methane;

octadecyl-3,5-di-tert-butyl-4-hydroxyhydrocinnamate;

2,2',2'-tris[(3,5-di-tert-butyl-4-hydroxyphenyl) propionyloxy]ethylisocyanurate;

tetrakis(2,4-di-tert-butyl-phenyl)-4,4'-biphenylene diphosphite;

4,4'-thiobis(6-tert-butyl-o-cresol);

2,2'-thobis(6-tert-butyl-4-methylphenol);

tris(2-methyl-4-hydroxy-5-tert-butylphenyl) butane;

2,2'-methylenebis(4-methyl-6-tert-butylphenol);

4,4'-methylenebis(2,6-di-tert-butylphenol);

4,4'-butylidenebis(3-methyl-6-tert-butylphenol);

2,6-di-tert-butyl-4-methylphenol;

4-hydroxymethyl-2,6-di-tert-butylphenol;

2,6-di-tert-4-n-butylphenol;

2,6-bis(2'-hydroxy-3'-tert-butyl-5'-methylbenzyl)-4-methylphenol;

4,4'-methylenebis(6-tert-butyl-o-cresol); and 4,4'-butylidene-bis(6-tert-butyl-m-cresol).

According to property of antioxidants, two or more kinds of that may be used at the same time. Further, it is preferable to use antioxidants and sodium hydrosulfite compound in combination in view of effects of antioxidant action, rust proof effect of die and neutralization effect of materials giving bad influence for the photographic property. Furthermore, it is preferable to use these in combination with carbon black because foregoing effects are synergistically activated.

In addition, it is possible to select antioxidants disclosed in:

Plastic Data Handbook, published by Kabushiki kaisha Kogyo Chosakai, pp. 794–799;

Plastic Additives Data, issued by K. K. Kagaku Kogyo Sha, pp. 327–329; and

Plastics Age Encyclopedia, Advanced Version (1986), issued by K. K. Plastic Age, pp. 211–212.

As the deodorant, there are, for example, organic carboxylic acid, mixture of organic carboxylic acid and zinc compound, and mixture of organic carboxylic acid, zinc compound and aluminum compound.

As the organic carboxylic acid, there are, for example, aliphatic polycarboxylic acid, aromatic polycarboxylic acid, and acidic polyester compound which is reaction product of the aliphatic or the aromatic polycarboxylic acid and polyhydric alcohol, and end of which is carboxyl group.

As the aliphatic polycarboxylic acid, there are di or tricarboxylic acid, for example, oxalic acid, malonic acid, succinic acid, adipic acid, fumaric acid, methylfumaric acid, maleic acid, methylmaleic acid, itaconic acid, acetylene acid, malic acid, methylmalic acid, citric acid, isocitric acid, mesaconic acid, cltraconic acid, and salt thereof. Especially, citric acid, fumaric acid and salt thereof are preferable.

As the aromatic polycarboxylic acid, there are aromatic carboxylic acid and anhydrous compound, for example, phthalic acid, terephthalic acid, isophthalic acid trimellitic acid, pyromellitic acid, benzene hexatricarboxylic acid, naphthalene dicarboxylic acid, naphthalene tricarboxylic acid, naphthalene tetracarboxylic acid, azo benzene tetracarboxylic acid. Especially, benzene tricarboxylic acid and trimellitic acid are preferable.

As the acidic polyester compound whose end is carboxyl group, there are polyester whose end is carboxyl group, in which polycarboxylic acid and polyhydric alcohol are reacted, and acidic cellulosic. As the zinc compound use in combination with the organic carboxylic acid, there are inorganic zinc salt and organic zinc. The inorganic zinc salt is zinc oxide, zinc chloride, zinc sulfate, zinc phosphate, zinc carbonate, and so on. The organic zinc is zinc citrate, zinc fumarate, and so on.

As the agent imparting fragrance, natural aromatic component and synthetic aromatic component are used by being wrapped with micro capsule, cyclodextrin, zeolite, starch, and talc. The natural aromatic component is, for example, lilac oil, jasmine, abies oil, cinnamon oil, lavender oil, and lemon oil. The synthetic aromatic component is, for example, geraniol, eugenol, n-octyl alcohol, carbitol, cis-jasmone, lemon terpene, menthane, methyl salicylate, metylphenyl carbinol, triethyl sitorate, benzyl benzoate, citral, d-limonene, ethylcinnamate, octanol, alkylene glycocoll, benzyl salicylate, linalool, vanillin, coumarin, methylnaphthyl ketone, and rose phenone.

In the injection molded article according to the present invention, at least one of above-described antioxidant, deodorant and agent imparting fragrance is totally included by 0.01–20 wt. %. As to the content, 0.05–17 wt. % is preferable, 0.1–15 wt. % is more preferable, and 0.5–12 is most preferable. When the content is less than 0.01 wt. %, kneading cost increases without effect due to adding them. When the content is more than 20 wt. %, material cost increases without effect due to increasing amount. Further, there are possibility that some of them give bad influence for the photographic property and reduce the physical strength of the injection molded article.

As the injection molded article used with photosensitive material according to the present invention, there are, for example, photo film cassette made of resin, photo disc film cartridge, instant film unit, lens-fitted film unit, photo film spool, light shielding container, photo film cassette, light shielding magazine for sheet-like or roll-like photosensitive material, winding spool, photo film cartridge, instant film pack, sheet film magazine, sheet film holder, photo film taking camera, photosensitive material developing unit, and sheet film unit. The present invention is available for various injection molded articles which are required to maintain perfect light shielding property and photographic property.

Typical injection molded articles according to the present invention are described bellow but these are not exclusive.

(1) Photo disc film cartridge: Japanese Utility Model Laid-open Publication No. 60-21743, etc.

(2) Lens-fitted film unit: Japanese Patent Laid-open Publication Nos. 63-226643, 8-114891, etc.

(3) Photo film spool: Japanese Patent Laid-open Publication Nos. 1-251030, 57-196218, 59-15049, 58-203436, 58-82237, 58-82236, 62-240957, 62-284355, 4-335638, 8-110614, Japanese Utility Model Laid-open Publication Nos. 63-73742, 54-120931, 58-178139 to 178145, Japanese Utility Model Publication Nos. 55-31541, 44-16777, U.S. Pat. No. 1,930,144, British Patent No. 2,199,805, etc.

(4) Photo film cassette: Japanese Patent Laid-open Publication Nos. 54-111822, 50-33831, 56-87039, 1-312538, 57-190948, 4-273240, 4-320258, 4-335344, 4-335639, 4-343353, 4-349454, Japanese Patent Publication Nos. 45-6991, 55-21089, Japanese Utility Model Laid-open Publication No. 55-97738, U.S. Pat. Nos. 4,846,418, 4,848,693, 4,887,776, etc.

(5) Photo film cassette container: Japanese Patent Laid-open Publication Nos. 61-250639, 61-73947, 63-121047, 62-291639, Japanese Patent Publication No. 2-38939, Japanese Utility Model Laid-open Publication Nos. 60-153451, 1-113235, 1-152337, Japanese Utility Model Publication Nos. 2-33236, 3-48581, U.S. Pat. Nos. 4,801,011, 4,639, 386, 4,979,351, European Patent Nos. 237,062, 280,065, 298,375, etc.

(6) Winding spool, film-like photosensitive material core, reel: Japanese Utility Model Laid-open Publication No. 60-107848, U.S. Pat. No. 4,809,923, British Patent No. 2,033,873, etc.

(7) Sheet film pack or sheet film unit: Japanese Patent Laid-open Publication Nos. 5-341379, 8-110568, 8-110569, 8-110570, etc.

(8) Photo film cartridge: Japanese Patent Laid-open Publication No. 1-312537, Japanese Utility Model Laid-open Publication Nos. 2-24846, 2-29041, Japanese Utility Model Publication Nos. 56-16610, 60-120448, etc.

(9) photo sheet film case: Japanese Patent Publication No. 2-54934, Japanese Utility Model Laid-open Publication Nos. 54-100617, 64-32343, 1-94258, 2-56139, U.S. Pat. No. 4,779,756, European Patent No. 242,905, etc.

(10) Instant Film pack: Japanese Patent Laid-open Publication Nos. 50-33831, 57-19048, 62-240961, 1-312538, 7-159931, 7-159932, 7-159933, Japanese Patent Publication No. 57-190948, Japanese Utility Model Laid-open Publication Nos. 61-41248, 55-97738, U.S. Pat. Nos. 4,834,306, 4,846,418, 4,887,776, etc.

(11) Photo film cassette made of resin (APS): Japanese Patent Laid-open Publication Nos. 50-33831, 57-190948, 1-312538, Japanese Patent Publication Nos. 45-6991, 55-21089, Japanese Utility Model Laid-open Publication No. 55-97738, U.S. Pat. Nos. 4,834,306, 4,846,418, 4,887, 776, etc.

Photosensitive materials being available for the injection molded articles are described bellow.

(1) Silver halide photosensitive material (printing film, color or black-and-white photographic paper, color or black-and-white negative film, photographic master paper, DTR photosensitive material, computerized photo-composition film, computerized photo-composition paper, micro film, color or black-and-white positive film, motion picture film, auto-developing photosensitive material, direct positive film and paper, etc.)

(2) Heat development photosensitive material (heat development color photosensitive material, heat development black-and-white photosensitive material which are disclosed in Japanese Patent Publication Nos. 43-4921, 43-4924, Japanese Patent Laid-open Publication Nos. 59-12431, 60-2950, 61-52343, U.S. Pat. No. 4,584,267, "Basis of photo optics, volume of silver salt photograph" pp. 553–555 (1979, issued by CORONA PUBLISHING CO., LTD.), "Search disclosure" (June, 1978, pp. 9–15, RD-17029)).

(3) Photosensitive, heat sensitive recording material (recording material utilizing photothermography disclosed in Japanese Patent Laid-open Publication No. 3-72358).

(4) Diazonium (4-morpholino benzene diazonium micro film, micro film, copying film, printing plate, etc.)

(5) Azido, diazido photosensitive material (photosensitive material including paraazido benzoate, 4,4'diazido stilbene and so on, for example, copying film and printing plate).

(6) Quinone diazido photosensitive material (ortho-quinone diazido, ortho-naphtho quinone azido compound, photosensitive material including benzoquinone (1,2)-diazido-(2)-4-sulfonic acid phenyl ether, for example, printing plate, copying film, contact film).

(7) Photo polymer (photosensitive material including vinyl monomer and so on, for example, printing plate, contact film).

(8) Polyvinyl cinnamate photosensitive material (printing film, IC register).

In manufacturing method for the injection molded article according to the present invention, wall temperature of a mold core and a mold cavity of a die is 100–200° C. The above-described styrene-based resin composition is melted and injected into the die to be packed therein. When the wall temperature of the core and the mold cavity fell under a Vicat softening point of the composition, an injection molded article is taken out.

In manufacturing method for the injection molded article according to the present invention, at first, the wall temperature of the mold core and the mold cavity is set at 100–200° C. In this state, melted styrene resin is injected and packed. By the way, if the wall temperature is 100° C. or less, flowability of the resin is lowered so that short shot and weld line tend to be generated. Accordingly, impact strength of the injection molded article goes down. If the wall temperature is 200° C. or more, heat deterioration becomes large and materials giving bad influence for the photographic property of the photosensitive material are generated. Further, lumps are generated and stains are generated on a surface of the die so that it is hard to perform successive injection mold during long time.

After the wall temperature of the mold core and the mold cavity became under the Vicat softening point of the styrene-based resin, the injection molded article is taken out. As to the wall temperature, 50° C. or less is preferable and 40° C. or less is more preferable. If the injection molded article is taken out when the wall temperature is over the Vicat softening point, deformation of the injection molded article occurs. Further, dimensional accuracy becomes bad so that good injection molded article is not obtained. It is important to control the wall temperature of the die.

Referring to the drawing, typical examples according to the present invention are described, however, the present invention is not restricted to these.

FIG. 1 is a front view of a photo film spool as an injection molded article used with photosensitive material according to the present invention. The photo film spool 10 is an integral mold constituted of a core 11 and flanges 12 provided on both sides thereof. The core 11 is provided with a slit 13 along an axial direction. One end of a photo film is inserted in the slit 13 and engages with a engaging claw 14 provided on an inner surface of the slit 13. The photo film is wound around the shaft 11 as a roll.

As to the photo film spool 10, content of butadiene rubber is 5 wt. % and content of styrene is 95 wt. %. Master batch pellet (becoming blend pellet at 200° C.) of 15 parts by weight and natural pellet (columnar pellet having diameter of 3 mm and length of 5 mm, becoming pellet at 220° C.) of 85 parts by weight are mixed with auto-batching mixer manufactured by Matsui Seisakusho. The natural pellet is styrene butadiene block copolymer resin pellet. As to the master batch pellet, styrene butadiene block copolymer resin pellet (columnar pellet having diameter of 3 mm and length of 5 mm, becoming pellet at 220° C., glass transition temperature is 98° C.), in which melt flow index is 16.2 g/10 minutes, Rockwell hardness is M42, density (JIS K-6871) is 1.04 g/cm$^3$, Vicat softening point is 85° C., Izod impact strength is 6.5 Kg·cm/cm, and bending elastic modulus is 22500 Kg/cm$^2$, is 81 wt. %, magnesium stearate as lubricant is 5 wt. %, polydimethyl siloxane, in which viscosity is 20000 centistoke, is 10 wt. %, furnace carbon black as light shielding material, in which mean particle size is 25 $\mu$m, pH is 8.1, ash content is 0.03%, sulfur is 0.05%, oil absorption is 82 ml/100 g, and cyanide content is 10 ppm, is 3 wt. %, tetrakis[methylene-3-(3',5'-di-tert-butyl-4'-hydroxyphenyl)propionate]methane, which is hindered phenol-based antioxidant, is 1 wt. %. After mixing, temperature of the resin is raised to 190° C. and molding is performed by using a molding machine NESTAR (trade name, manufactured by Sumitomo Juki, clamping pressure is 150 ton). When injection and packing are carried out, wall temperature of mold core and mold cavity of the die which is semi hot runner type is 135° C. After cooling until 35° C., the photo film spool 10 is taken out from the die. Molding cycle is about 7 seconds.

The photo film spool 10 is constituted of styrene butadiene block copolymer resin of 12.15 wt. %, natural pellet of 85 wt. %, stearic acid magnesium of 0.75 wt. %, polydimethyl siloxane of 1.5 wt. %, hindered phenol-based antioxidant of 0.15 wt. %, and furnace carbon black of 0.45 wt. %. The styrene butadiene block copolymer resin is included in the master batch and experiences three times thermal histories at 150° C. or more. The natural pellet dilutes the master batch and is pellet of the styrene butadiene block copolymer resin passing through two times thermal histories of 150° C. or more.

With respect to the photo film spool 10, the photographic property is kept in good condition during two years, winding torque of photo film is small so that winding inferior does not occur during photographing and heat deformation and fog do not occur although the cassette is put in an automobile under the solar light of summer. Further, when the photo film spool is taken out from the photo film cassette container after one year, there is little bad smell.

When the master batch pellet is made, specific furnace carbon black, specific lubricant, specific hindered phenol-based antioxidant and the styrene butadiene block copolymer resin pellet having high melt flow index are mixed and kneaded at about 200° C. to become the pellet. The surface of the specific furnace carbon black is covered by stearic acid magnesium and dimethyl polysiloxane so as to be dispersed uniformly in the polystyrene resin. Further, it is hard to absorb moisture of the air. Accordingly, blowing of silver due to moisture in the resin and short shot do not occur. Further, neutralization of halide due to the stearic acid magnesium and pyrolysis of lubricant and polystyrene resin are prevented so that deterioration of photographic property and bad smell are prevented.

Figure 2:
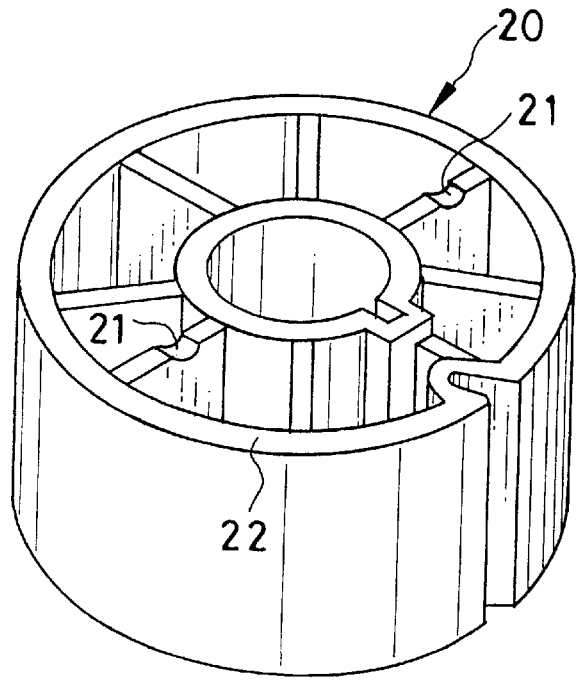
FIG. 2 is a perspective top view of a core for film-like photosensitive material as an injection molded article used with photosensitive material according to the present invention.
Figure 3:
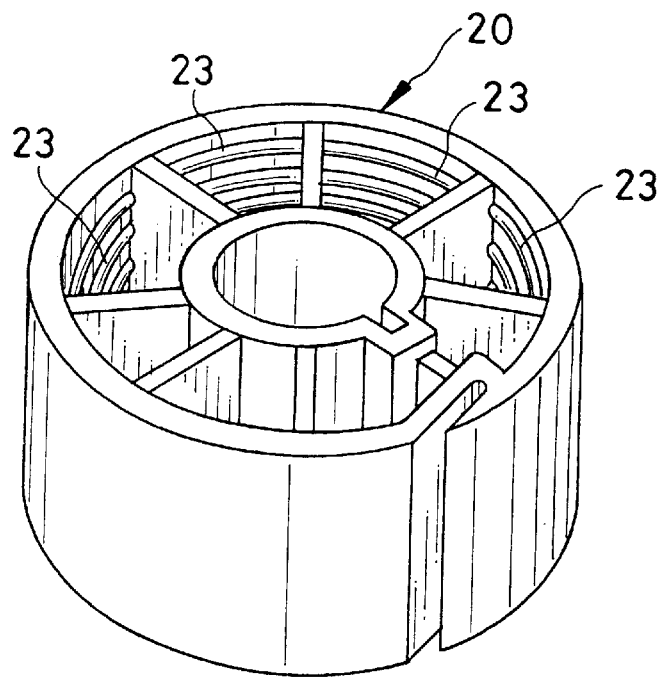
FIG. 3 is a perspective bottom view of the core.

FIGS. 2 and 3 are perspective view of a core for film-like photosensitive material as an injection molded article used with photosensitive material according to the present invention. The core 20 is wound with a motion picture film or the like. FIG. 2 shows a state in that a gate 21 is positioned at top. FIG. 3 shows a state in that the gate 21 is positioned at bottom. A plurality of circular ridges 23, height of which is 0.02–0.7 mm, are provided on an inner surface of an outer cylinder 22 of the core 20 to improve injection moldability, physical strength and appearance of the core 20. The core 20 is formed with the resin composition according to the present invention.

As to the core 20, content of the butadiene rubber is 6 wt. % and content of the styrene is 94 wt. %. Styrene-based resin composition is injected from the gate 21 in a state that resin temperature is 190° C. and injection mold is performed in a state that mold die temperature is 110° C. With respect to the styrene-based resin composition, styrene butadiene block copolymer resin pellet (columnar pellet having diameter of 3 mm and length of 3 mm, through thermal history of 200° C.), in which melt flow index is 12 g/10 minutes, density is 1.05 g/cm$^3$, Rockwell hardness is M53, Izod impact strength is 6.5 Kg·cm/cm, Vicat softening point is 85° C., and bending elastic modulus is 21500 Kg/cm$^2$, is 84.9 wt. %, magnesium stearate as lubricant is 1.0 wt. %, polyethylene wax, in which molecular weight is 3500, is 2 wt. %, ethylene 4 methyl pentene-1 copolymer resin pellet (columnar pellet having diameter of 2.5 mm and length of 5 mm, having experienced two times thermal histories at 200° C.) in which melt flow index is 7.5 g/10 minutes, density is 0.920 g/cm$^3$, is 10 wt. %, anatase-type $TiO_2$ is 2 wt. %, tetrakis[methylene-3-(3',5'-di-tert-butyl-4'-hydroxyphenyl)propionate]methane is 0.05 wt. %, n-octadecyl-3-(4'-hydroxy-3'-5'-di-tert-butyl-phenol) propionate is 0.05 wt. %.

The core 20 is provided with three circular ridges 23, height of which is 0.1 mm, on the inner surface of the outer cylinder 22. The ridges 23 are located at opposite side to the gate. Accordingly, flowability of the resin is improved and generation of weld line is not found. Injection moldability is excellent, there is few molding trouble, and abrasion resistance is excellent. Further, Izod impact strength and compressive strength are excellent and it is possible to use for 10,000 feet of motion picture positive film.

The wall temperature of the die is set at 100–200° C. and melted styrene-based resin is injected into the die. After the wall temperature fell under the Vicat softening point of the resin, the injection molded article is taken out. In this case, there are few weld lines. Izod impact strength is improved in contrast with conventional condition in which die temperature is 90° C. or less. It is possible to carry out the injection mold by injection pressure which is half or less of conventional pressure, namely, 300 Kg/cm$^2$ or less. Further, deformation is little and dimensional accuracy is improved.

Figure 4:
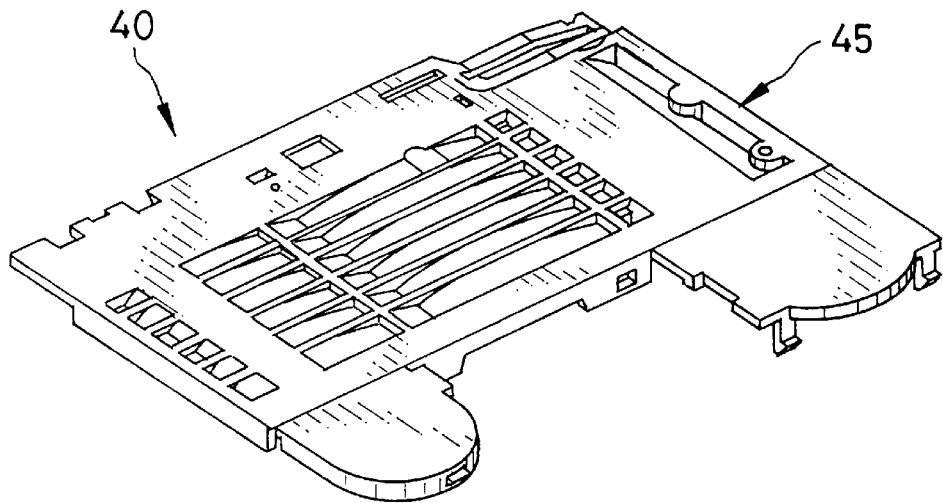
FIG. 4 is an exploded perspective view of a lens-fitted film unit as an injection molded article used with photosensitive material according to the present invention.
Figure 4:
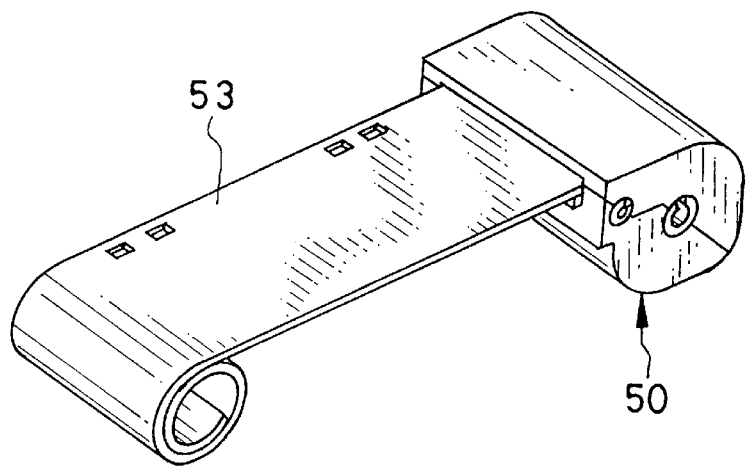
Figure 4:
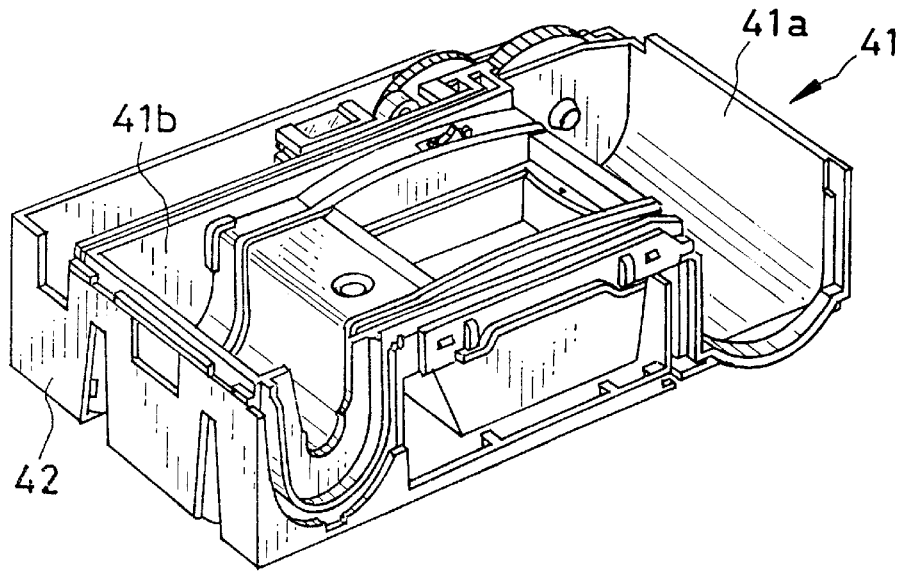

Hereinafter, other injection molded articles according to the present invention are described. FIG. 4 shows an exploded perspective view of a lens-fitted film unit as an injection molded article according to the present invention. In the lens-fitted film unit, a photo film is loaded in advance. Almost all parts thereof are molded by using the resin composition according to the present invention to obtain an excellent impact resistance and good reuse property.

The lens-fitted film unit 40 comprises a main body 41 in which simple photographing mechanism, film winding stop mechanism and so forth are attached. A front cover 42 is attached to the main body 41 to cover a front side thereof. The main body 41 is provided with a cassette chamber 41a and a film roll chamber 41b. A photo film cassette 50 is contained in the cassette chamber 41a. A roll-like photo film 53 drawn out from the cassette 50 is contained in the film roll chamber 41b. A rear cover 45 is attached to a rear side of the main body 41 to cover the cassette chamber 41a and the film roll chamber 41b in light-tight manner. In this case, APS-type photo film cassette which is made of resin is loaded, however, 135-type photo film cassette which is well known may be loaded. Moreover, the film roll chamber 41b may be provided with a core.

Figure 5:
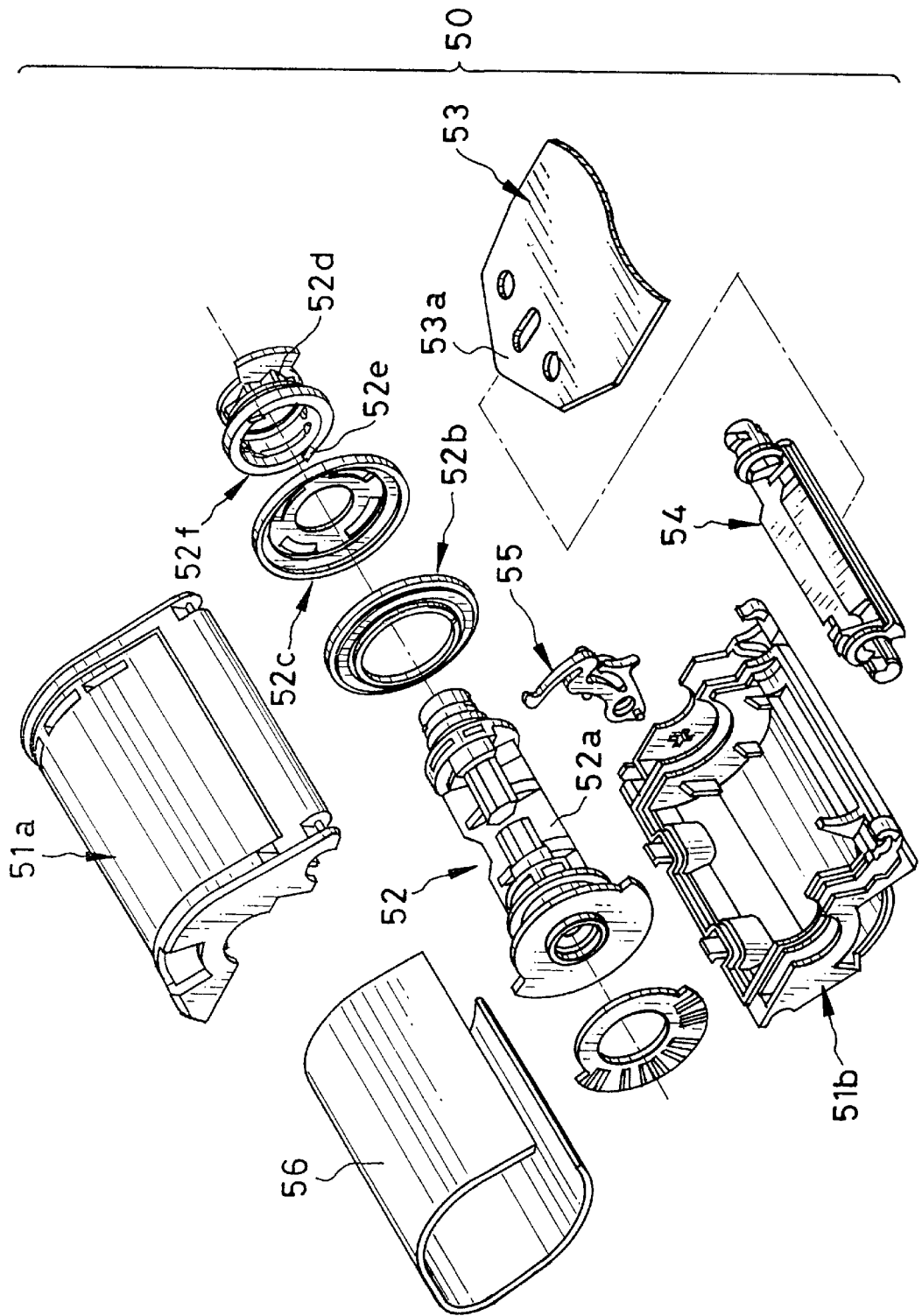
FIG. 5 is an exploded perspective view of a photo film cassette made of resin (for APS) as an injection molded article used with photosensitive material according to the present invention.

FIG. 5 shows an exploded perspective view of the photo film cassette (APS) made of resin, as the injection molded article according to the present invention. The photo film cassette contains whole photo film in the cassette main body and the photo film is advanced by rotating a spool thereof. The photo film cassette 50 is constituted of an upper case 51a, a lower case 51b, a cassette spool 52 rotatably attached therein, and a photo film 53. One end 53a of the photo film 53 engages with the spool 52. The photo film 53 is wound around the spool 52. The upper case 51a and the lower case 51b constitute the cassette main body. Each part except the photo film is made of the resin composition according to the present invention.

A pair of discs 52b and 52c are fixed to the spool shaft 52a. Outer periphery of the discs 52a and 52c are curved in facing direction each other and the curved portions hold an outer surface of the photo film 53 wound on the spool 52 to prevent the photo film from loosening. Further, a hold ring 52f integrally formed with an engaging tooth 52d and an engaging claw 52e is fixed to the spool shaft 52a. The engaging tooth 52d operates to stop the rotation of the spool shaft 52a. The engaging claw 52e engages with the disk 52c from the outside and rotates the disc 52c in a film advancing direction (clockwise direction in FIG. 5) only when the spool 52 is rotated in the film advancing direction.

A light shielding lid 54 and a lock lever 55 are attached to the lower case 51b. The light shielding lid 54 is located in a film passage formed at joint portion of the upper case 51a and the lower case 51b. The light shielding lid 54 is rotatable between a light shield position in which the film passage is closed in light-tight manner and a open position in which the film passage is opened. The lock lever 55 engages with the engaging tooth 52d to prohibit the rotation of the spool shaft 52a when the light shielding lid 54 is set in the light shield position. The lock lever 55 is released from engaging with the engaging tooth 52d to permit the rotation of the spool shaft 52a when the light shielding lid is rotated to the open position. Reference numeral 56 denotes a label seal on which kind of photo film, possible number of photographs and so forth are printed. The label seal 56 is stuck after the upper case 51a and the lower case 51b are joined.

Figure 6:
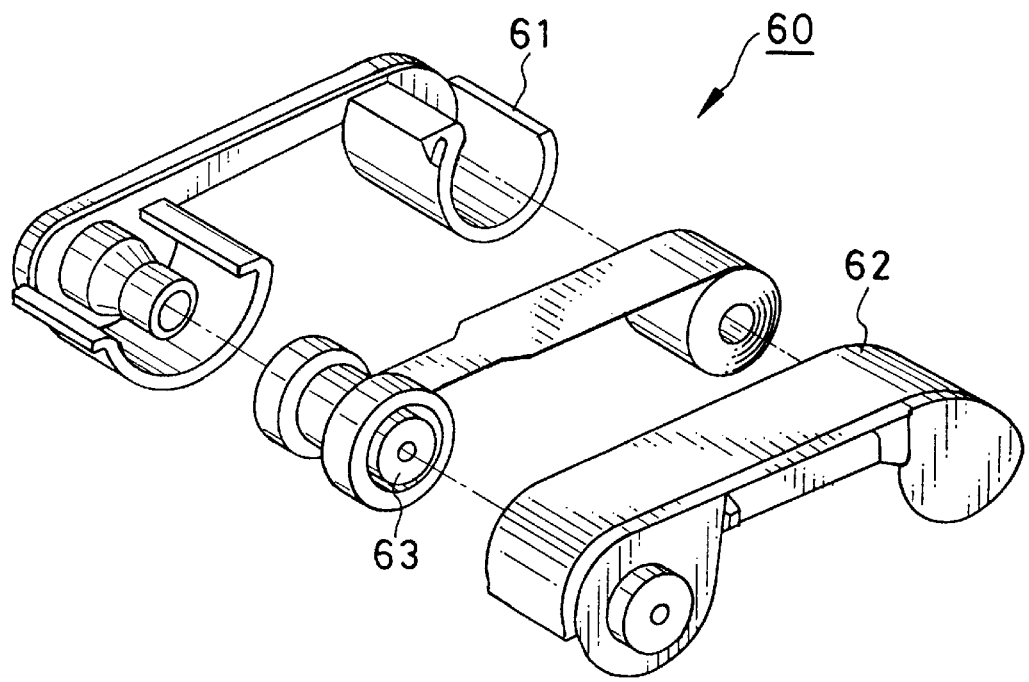
FIG. 6 is an exploded perspective view of a photo film cartridge as an injection molded article used with photosensitive material according to the present invention.

FIG. 6 is an exploded perspective view of a photo film cartridge 60 as the injection molded article according to the present invention. This is a cartridge type in which 110-type photo film is loaded. The photo film cartridge 60 is constituted of a bottom case 61, a top case 62 and a cartridge spool 63 loaded thereinto. The bottom case 61 and the top case 62 are made of the resin composition according to the present invention.

Figure 7:
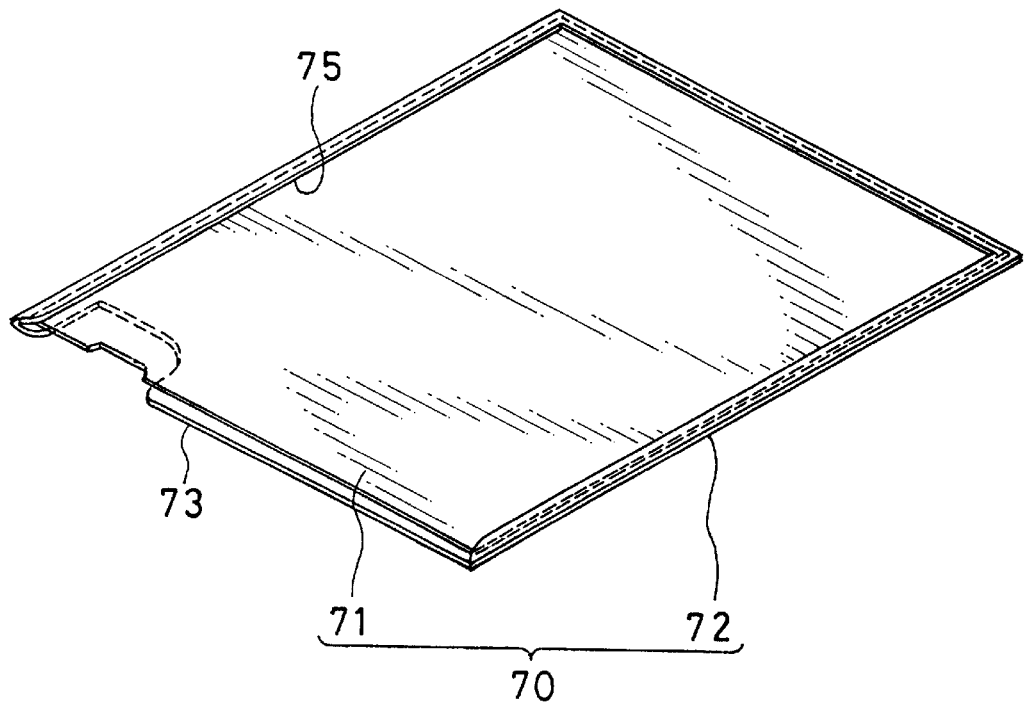
FIG. 7 is a perspective view of a sheet film unit as an injection molded article used with photosensitive material according to the present invention.

FIG. 7 is a perspective view of a sheet film unit. The sheet film unit 70 is constituted of a sheet film 71 and a film sheath 72 containing the sheet film 71. The film sheath 72 is an injection molded article according to the present invention. The film sheath 72 comprises a bottom portion 73 supporting base face of the sheet film 71 and a groove 75 formed so as to surrounding three sides of the sheet film 71 except one side thereof. The film sheath 72 is made of the resin composition according to the present invention as single piece.

Figure 8:
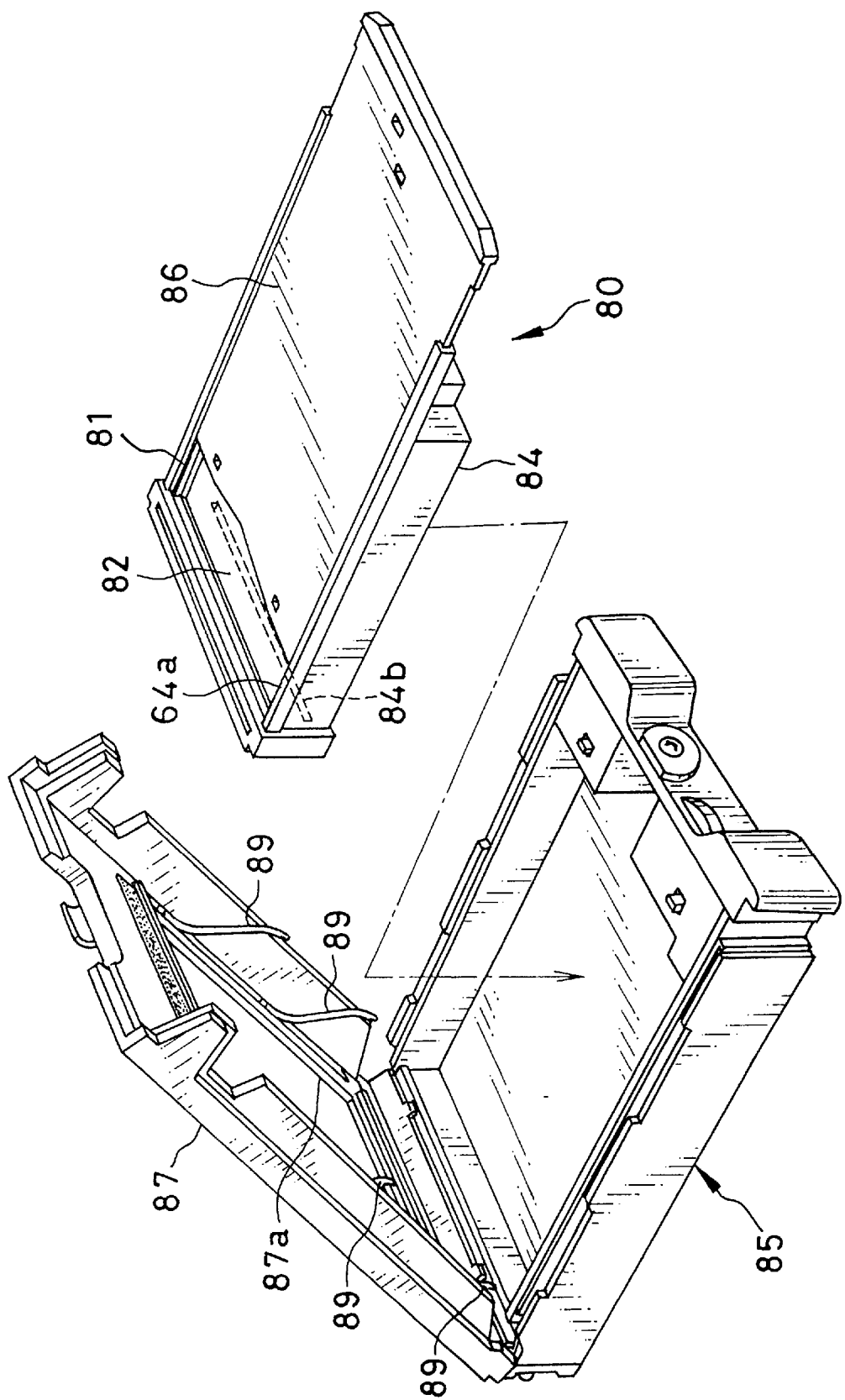
FIG. 8 is a perspective view of a sheet film pack as an injection molded article used with photosensitive material according to the present invention.

FIG. 8 is a perspective view of a sheet film pack as the injection molded article according to the present invention. The sheet film pack 80 contains a plurality of sheet film units 70 in which a sheet film 82 is contained in a pack sheath 81. The sheet film units are stacked in a pack main body 84 made of resin. The sheet film pack 80 is loaded in a pack holder 85 attached to a camera. The pack main body 84 is provided with an opening 84a to perform exposure for top of stacked sheet film and a pull lid 86 for closing the opening 84a. Further, The pack main body 84 is provided with a spring member (not shown) for pressing the sheet film unit 70 from the back side thereof toward the opening 84a.

Upon loading the sheet film pack 80 into the pack holder 85 and closing a holder cover 87 of the pack holder 85, the opening 84a of the pack main body 84 emerges from an exposure aperture 87a formed in the holder cover 87. When the pull lid 86 of the sheet film pack 80 is pulled until predetermined position, top of the sheet film unit 70 is pushed out from the opening 84a and moved to an exposure position so as to cover the exposure aperture 87a of the holder cover 87.

Upon returning the pull lid 86 to original position, the pull lid 86 is inserted between top of the sheet film unit 70 and next one. After that, photographing operation is carried out and the pull lid 86 is pulled. At this time, an inner frame 88 attached in the pack holder 85 is drawn out in a state that the inner frame keeps the pack main body 84. The exposed sheet film unit 70 stops at the exposure position so that the exposed sheet film unit 70 is pressed toward the back inner wall of the pack holder 85 by means of four plate springs 89 provided on an inner wall of the holder cover 87.

Next, upon returning the pull lid 86 to the original position, the pack main body 84 is returned to an original position in the pack holder 85 with the inner frame 88. At this time, exposed sheet film unit 70 enters the pack main body 84 from an opening 84*b* formed in a side wall of the pack main body 84. The opening 84*b* is located at lower portion of the side wall relative to moving direction of the pack main body 84. Accordingly, the exposed sheet film unit is contained at end of stacked sheet film units 70. Above-described operation is repeated so that all sheet film units 70 contained in the pack main body 84 are successively exposed.

Figure 9:
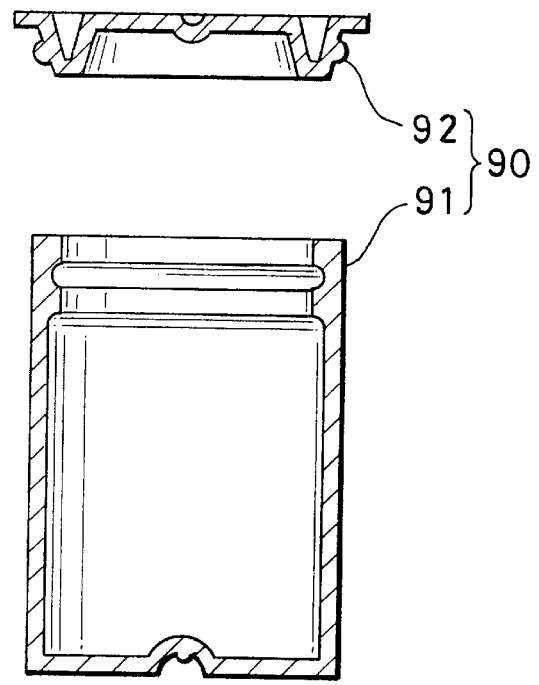
FIG. 9 is a sectional view of a separate-type photo film cassette container as an injection molded article used with photosensitive material according to the present invention.
Figure 10:
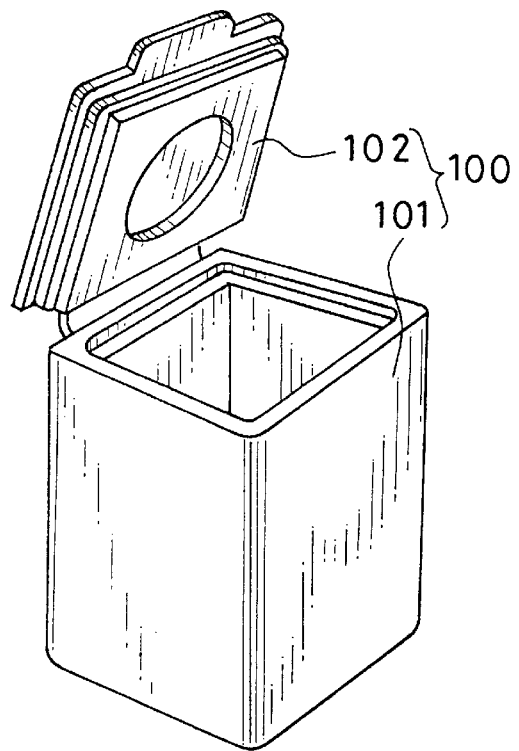
FIG. 10 is a sectional view of an integral-type photo film cassette container as an injection molded article used with photosensitive material according to the present invention.

FIGS. 9 and 10 are sectional views of a separate-type and an integral-type photo film cassette container as the injection molded article according to the present invention respectively. The photo film cassette containers protect, for example, 135-type photo film cassette and forgoing photo film cassette made of resin from dust, outdoor daylight and so on. The separate-type photo film cassette container 90 comprises a container main body 91 and a container lid 92 fitted into a top of the container main body 91. These are injection molded articles according to the present invention. As to the integral-type photo film cassette container 100, a container main body 101 is integrally formed with a container lid 102.

Figure 11:
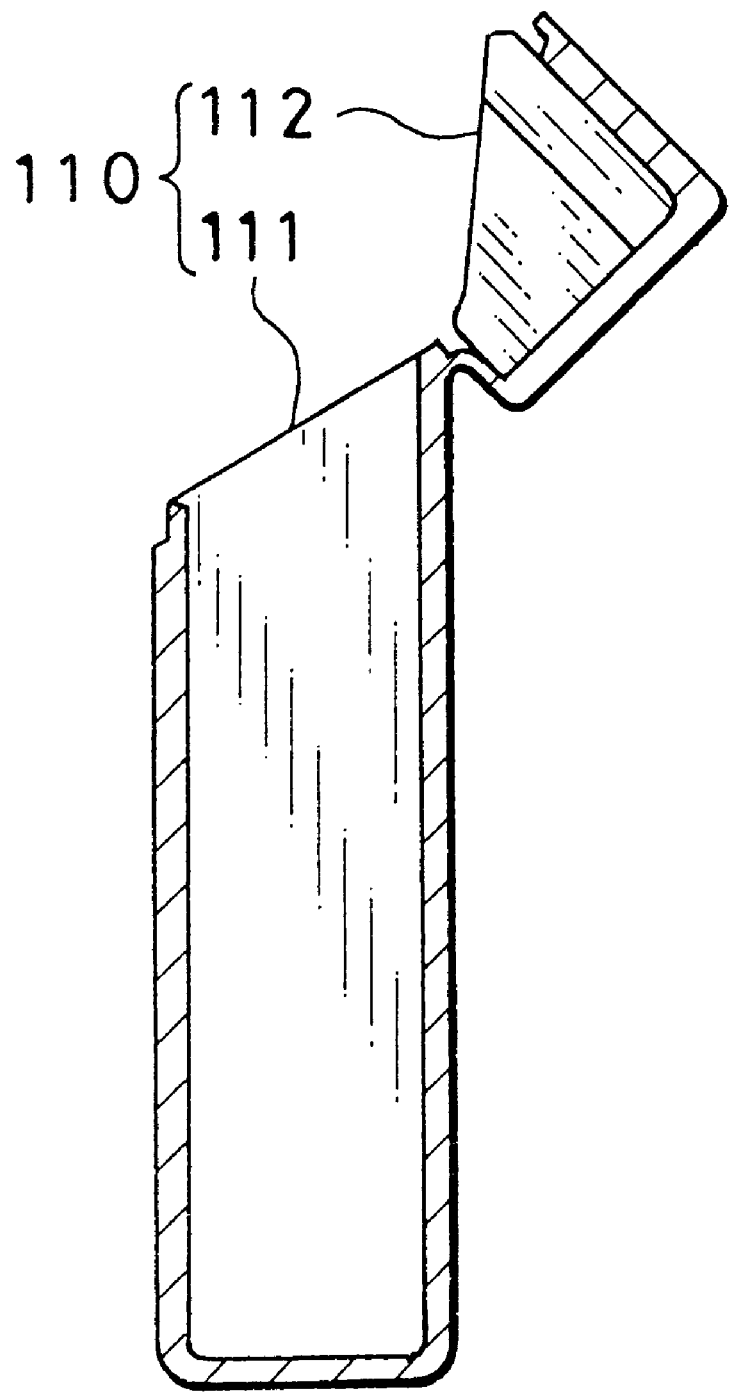
FIG. 11 is a sectional view of an integral-type photo sheet film case as an injection molded article used with photosensitive material according to the present invention.

FIG. 11 is a sectional view of an integral-type photo sheet film case as an injection molded article according to the present invention. The photo sheet film case contains, for example, micro film. The photo sheet film case 110 is an integral mold of a case main body 111 and a case lid 112.

EXAMPLE 1

The photo film spool 10 shown in FIG. 1 was molded out of styrene-based resin composition, main ingredient of which is impact resistance polystyrene resin produced by continuous bulk polymerization method. The styrene-based resin composition includes ethylbenzene of 0.07 wt. %, butadiene rubber of 5 wt. % in which mean particle size is 2.2 $\mu$m, furnace carbon black of 0.4 wt. % in which Mohs hardness is 2.0, specific gravity is 1.8, refraction index measured by Larsen oil immersion method is 1.61, particle size is 21 m$\mu$, and all content of sulfur is 0.4%, titanium oxide of 0.1 wt. % which is dispersibility light shielding material of the furnace carbon black and in which Mohs hardness is 6.0, specific gravity is 4.0 and refraction index measured by Larsen oil immersion method is 2.75, hindered phenol-based antioxidant of 0.1 wt. %, calcium stearate of 0.1 wt. %, zinc stearate of 0.1 wt. %, silicone oil (dimethyl polysiloxane) in which viscosity is 20,000 centistoke at 25° C., liquid paraffin of 0.2 wt. % which is hydrocarbon lubricant as dispersant of light shielding material, and impact resistance polystyrene resin in which melt flow index is 8 g/10 minutes, Vicat softening point (load is 5 Kg) is 98° C., bending elastic modulus is 29,000 Kg/cm$^2$, Rockwell hardness is M52, and Izod impact strength 4.2 Kg·cm/cm. Injection mold was carried out by using the molding machine NESTAR (trade name, manufactured by Sumitomo Juki, clamping pressure is 150 ton). At that time, resin temperature is 250° C., ejection number is 24, and cycle is 6.5 sec.

As to the photo film spool, injection moldability was excellent and there were few molding troubles so that it was possible to perform unmanned manufacturing and any inspection was not necessary. Further, quality of the injection molded article was excellent. There was not anything for the photographic property after two-year storage in storehouse of 15° C. Physical strength did not fall and change of dimension did not occur. Torque of winding photo film was small so that winding trouble was 0% during photograph. Photographic fog did not occur. Heat deformation and fog did not occur although the cassette containing color negative film of ISO sensitive 400 was put in an automobile under the solar light (about 100,000 Lux) of summer during two hours. Appearance is also excellent so that worth of good is high.

Comparative 1

An injection molded article comprising a photo film spool shown in FIG. 1 was molded by using similar styrene-based resin composition in Example 1 except that ethylbenzene is 0.02 wt. %. Similar injection molding machine and similar die in Example 1 were used. As to the photo film spool, at 205° C. of resin temperature, blowing, short shot and silver streak occur in abundant, further, weld mark occurs strongly so that it was impossible to put the photo film spool to practical use.

In order to solve these problem, the resin temperature was lowered to 180° C. As the result of that, weld mark occurs more strongly, further, strength and light shielding ability were lacked so that it is impossible to put the injection molded article to practical use.

Comparative 2

An injection molded article comprising a photo film spool shown in FIG. 1 was molded by using similar styrene-based resin composition in Example 1 except that ethylbenzene is 0 wt. %, calcium stearate is 0 wt. %, zinc stearate is 0 wt. %, and liquid paraffin is 0 wt. %. Reduced amount was supplemented with the impact resistance polystyrene resin. Similar injection molding machine and similar die in Example 1 were used.

As to the photo film spool, dispersibility of the rubber-like material and the light shielding material were bad, short shot occurs, weld mark occurs strongly, and there are problems with regard to physical strength and light shielding property. Accordingly, it was impossible to put the photo film spool to practical use. Further, as to a color negative film, ISO sensitivity of which is 400, processed by forced deterioration test (temperature is 50° C., humidity is 80%) during three days, photographic fog increased and deterioration problem of photographic property occurred.

EXAMPLE 2

An injection molded article comprising a photo film spool shown in FIG. 1 was molded by using similar styrene-based resin composition in Example 1 except that furnace carbon black is 0.5 wt. % and titanium oxide is 0 wt. %. Similar injection molding machine and similar die in Example 1 were used. The photo film spool was inferior a little with respect to physical strength, light shielding property, weld mark, and appearance in comparison with Example 1, however, the other is equivalent to that of Example 1. The photo film spool was superior in comparison with comparative 1 and 2, and conventional one.

EXAMPLE 3

An injection molded article comprising a photo film spool shown in FIG. 1 was molded by using similar styrene-based resin composition in Example 1 except that black iron oxide (iron oxide, $Fe_3O_4$) of 0.1 wt. %, in which Mohs hardness is 6.0 and specific gravity is 4.7, is used instead of titanium oxide of 0.1 wt. %. Similar injection molding machine and similar die in Example 1 were used. The photo film spool had excellent property, injection moldability and appearance which are equivalent to Example 1.

The styrene-based resin composition of Examples 1–3 was used for injection molded articles which are the front cover 42 and the rear cover 45 shown in FIG. 4, the upper case 51a, the lower case 51b and the cassette spool 52 shown in FIG. 5, the bottom case 61, the top case 62 and cartridge spool 63 shown in FIG. 6, the film sheath 72 shown in FIG. 7, and the pack main body 84, the pull lid 86 and the pack holder 85 shown in FIG. 8. As a consequence, photographic property, dispersibility of the light shielding material, dimensional accuracy, physical strength, injection moldability, appearance, and light shielding property were excellent similar to Examples 1–3. Moreover, recycling property after using was excellent and common use of the resin composition have been possible for various injection molded articles. Accordingly, cost was decreased more than 20% due to reduction of stock and so forth.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An injection molded article for handling a photographic photosensitive material, said article being formed of a styrene-based resin composition having a melt flow index of 1–50 g/10 minutes and comprising:
   at least 50 wt. % of a styrene-based resin;
   0.001–1 wt. % of ethylbenzene;
   0.1–15 wt. % of a rubber material selected from the group consisting of ethylene propylene copolymer, ethylene propylene non-conjugated diene copolymer, isoprene copolymer, polyisoprene, styrene-isoprene copolymer, polybutadiene, and styrene butadiene copolymer; and
   0.1–10 wt. % of a light shielding material.

2. An injection molded article according to claim 1, wherein said injection molded article is one of a spool for winding a photo film, a cassette shell for containing said spool, a core for a photosensitive material, a pack for containing a sheet film, and a container for containing a photo film cassette.

3. An injection molded article according to claim 1, wherein said styrene-based resin composition further comprises 0.01–10 wt. % of a lubricant.

4. An injection molded article according to claim 1, wherein said light shielding material is carbon black having a mean particle size of 10–120 mμ, a DBP oil absorption of at least 50 ml/100 g, and a free sulfur content of 0.1% or less.

5. An injection molded article according to claim 1, wherein said styrene-based resin composition further comprises 0.001–10 wt. % of a silicon lubricant.

6. An injection molded article according to claim 1, wherein said light shielding material has a Mohs hardness of at least 2.5 and a specific gravity of at least 2.0.

7. An injection molded article according to claim 1, wherein said styrene-based resin has a melt flow index of 3.0–40.0 g/10 minutes, a Rockwell hardness of at least M38, an Izod impact strength of at least 2.0 Kg·cm/cm, a bending elastic modulus of at least 20,000 Kg/cm$^2$, and a Vicat softening point of at least 78° C. and said styrene-based-resin composition further comprising:
   a total of 0.01–20 wt. % of at least two constituents selected from the group consisting of lubricants and surfactants;
   at least 3 wt. % of a thermoplastic resin having at least twice experienced heating to at least 150° C.; and
   a total of 0.01–20 wt. % of at least one of an antioxidant, a deodorant and an agent imparting fragrance.

8. An injection molded article according to claim 7, wherein said styrene-based resin composition comprises 0.01–5 wt. % of carbon black having a mean particle size of 10–120 mμ, DBP oil absorption of at least 50 ml/100 g, and a free sulfur content of 0.1% or less.

9. An injection molded article according to claims 1 or 7, wherein said styrene-based resin composition further comprises 0.001–10 wt. % of one of a higher fatty acid and a higher fatty acid metal salt.

10. An injection molded article according to claim 7, wherein said styrene-based resin composition further comprises 0.001–10 wt. % of a light shielding material having a Mohs hardness of at least 2.5 and a specific gravity of at least 2.0.

11. An injection molded article according to claims 1 or 7, wherein said styrene-based resin composition is melted and injected into a die in which a wall temperature of a mold core and a mold cavity is 100–200° C., said injection molded article being removed from said die when said wall temperature falls under a Vicat softening point of said styrene-based resin composition.

12. An injection molded article formed of a styrene-based resin composition having a melt flow index of 1–50 g/10 minutes, and including at least 50 wt. % of a styrene-based resin, 0.001–1 wt. % of ethylbenzene, 0.1–15 wt. % of a rubber material selected from the group consisting of ethylene propylene copolymer, ethylene propylene non-conjugated diene copolymer, isoprene copolymer, polyisoprene, styrene-isoprene copolymer, polybutadiene, and styrene butadiene, and 0.1–10 wt. % of a light shielding material, said article being prepared by a process comprising the steps of:
   melting said styrene-based resin composition;
   injecting said melted composition into a die in which a wall temperature of a mold core and a mold cavity is 100–200° C.; and
   removing said injection molded article from said die when said wall temperature falls under a Vicat softening point of said styrene-based resin composition.

13. An injection molded article according to claim 1, wherein said styrene-based resin has a melt flow index of 3.0–40.0 g/10 minutes, a Rockwell hardness of at least M38, an Izod impact strength of at least 2.0 Kg·cm/cm, a bending elastic modulus of at least 20,000 Kg/cm$^2$, and a Vicat softening point of at least 78° C., and said styrene-based-resin composition further including a total of 0.01–20 wt. % of at least two constituents selected from the group consisting of lubricants and surfactants, at least 3 wt. % of a thermoplastic resin having at least twice experienced heating to at least 150° C., and a total of 0.01–20 wt. % of at least one of an antioxidant, a deodorant and an agent imparting fragrance, said article being prepared by a process comprising the steps of:
   melting said styrene-based resin composition;
   injecting said melted composition into a die in which a wall temperature of a mold core and a mold cavity is 100–200° C.; and
   removing said injection molded article from said die when said wall temperature falls under a Vicat softening point of said styrene-based resin composition.

* * * * *

UNITED STATES PATENT AND TRADEMARK OFFICE
CERTIFICATE OF CORRECTION

PATENT NO. : 5,906,813
DATED : May 25, 1999
INVENTOR(S) : Mutsuo Akao

It is certified that error appears in the above-identified patent and that said Letters Patent is hereby corrected as shown below:

IN THE CLAIMS:

7. An injection molded article according to claim 1, wherein said styrene-based resin has a melt flow index of 3.0-40.0 g/10 minutes, a Rockwell hardness of at least M38, an Izod impact strength of at least 2.0 Kg·cm/cm, a bending elastic modulus of at least 20,000 Kg/cm$^2$, and a Vicat softening point of at least 78 °C[.], and said styrene-based resin composition further [comprising] comprises:

a total of 0.01-20 wt.% of at least two constituents selected from the group consisting of lubricants and surfactants;

at least 3 wt.% of a thermoplastic resin having at least twice experienced heating to at least 150 °C; and a total of 0.01-20 wt.% of at least one of an antioxidant, a deodorant and an agent imparting fragrance.

13. (Four Times Amended) An injection molded article according to claim 1, wherein said styrene-based resin has a melt flow index of 3.0-40.0 g/10 minutes, a Rockwell hardness of at least M38, an Izod impact strength of at least 2.0 Kg·cm/cm, a bending elastic modulus of at least 20,000 Kg/cm$^2$, and a Vicat softening point of at least 78 °C, and said styrene-based-resin composition further [including] includes a total of 0.01-20 wt.% of at least two constituents selected from the group consisting of lubricants and surfactants, at least 3 wt.% of a thermoplastic resin having at least twice experienced heating to at least 150 °C, and a total of 0.01-20 wt.% of at least one of an antioxidant, a deodorant and an agent imparting fragrance, said article being prepared by a process comprising the steps of:

UNITED STATES PATENT AND TRADEMARK OFFICE
CERTIFICATE OF CORRECTION

PATENT NO. : 5,906,813
DATED : May 25, 1999
INVENTOR(S) : Mutsuo Akao

It is certified that error appears in the above-identified patent and that said Letters Patent is hereby corrected as shown below:

melting said styrene-based resin composition;
      injecting said melted composition into a die in which a wall temperature of a mold core and a mold cavity is 100-200 °C; and
      removing said injection molded article from said die when said wall temperature falls under a Vicat softening point of said styrene-based resin composition.

Signed and Sealed this

Thirteenth Day of June, 2000

*Attest:*

Q. TODD DICKINSON

*Attesting Officer*      *Director of Patents and Trademarks*